United States Patent
Olender et al.

(10) Patent No.: US 12,523,608 B2
(45) Date of Patent: Jan. 13, 2026

(54) USING FLIM FOR BIOPSY BEFORE CHEMICAL FIXATION

(71) Applicant: Caelum Diagnostic Solutions, Inc, Venice, CA (US)

(72) Inventors: Derek S. Olender, San Jose, CA (US); Rachel Beth Wellner, Venice, CA (US); Lu Wang, San Jose, CA (US)

(73) Assignee: Caelum Diagnostic Solutions, Inc., Marina Del Rey, CA (US)

( * ) Notice: Subject to any disclaimer, the term of this patent is extended or adjusted under 35 U.S.C. 154(b) by 445 days.

(21) Appl. No.: 18/149,049

(22) Filed: Dec. 30, 2022

(65) Prior Publication Data

US 2023/0213448 A1    Jul. 6, 2023

Related U.S. Application Data

(60) Provisional application No. 63/266,230, filed on Dec. 30, 2021.

(51) Int. Cl.
| | | |
|---|---|---|
| *G01N 21/64* | (2006.01) | |
| *G02B 21/00* | (2006.01) | |
| *G02B 21/26* | (2006.01) | |
| *G02B 21/34* | (2006.01) | |

(Continued)

(52) U.S. Cl.
CPC ..... *G01N 21/6458* (2013.01); *G02B 21/0076* (2013.01); *G02B 21/26* (2013.01); *G02B 21/34* (2013.01); *G02B 21/362* (2013.01); *A61B 5/0071* (2013.01);

(58) Field of Classification Search
CPC .......... G01N 21/6458; G01N 21/6408; G02B 21/0076; G02B 21/26; G02B 21/34; G02B 21/362; G02B 21/16; G02B 21/365; G02B 21/367; A61B 5/0071
See application file for complete search history.

(56) References Cited

U.S. PATENT DOCUMENTS

| 8,000,511 B2 | 8/2011 | Perz |
| 9,528,918 B2 | 12/2016 | Reinhardt et al. |
| 9,851,550 B2 | 12/2017 | Soenksen |

(Continued)

FOREIGN PATENT DOCUMENTS

| KR | 20130123190 | 11/2013 |
| WO | 2021150984 | 7/2021 |
| WO | 2023130100 | 7/2023 |

OTHER PUBLICATIONS

"Separating NADH and NADPH fluorescence in live cells and tissues using FLIM", Nature Communications DOI: 10.1038 ncomms4936, (May 29, 2014), 9 pgs.

(Continued)

*Primary Examiner* — Mustak Choudhury
(74) *Attorney, Agent, or Firm* — MLO, a professional corp.

(57) ABSTRACT

A method is provided comprising: positioning a slide that includes a concave region that is formed in a top surface of the slide and that can contain an object, such that a focal point of an objective lens of a fluorescence lifetime imaging microscopy (FLIM) device is within an area of the concave region between a bottom surface of the concave region and the top surface of the slide; and using the FLIM device to capture a sequence of wide field images of a portion of the object within a field of view of the objective lens.

9 Claims, 17 Drawing Sheets

(51) Int. Cl.
    *G02B 21/36* (2006.01)
    *A61B 5/00* (2006.01)

(56) References Cited

U.S. PATENT DOCUMENTS

| | | | |
|---|---|---|---|
| 10,007,102 B2 | 6/2018 | Bickert et al. | |
| 10,061,107 B2 | 8/2018 | Loney et al. | |
| 10,088,665 B2 | 10/2018 | Zhao et al. | |
| 10,162,166 B2* | 12/2018 | Casas | G02B 21/0072 |
| 11,164,316 B2 | 11/2021 | Barnes et al. | |
| 2005/0157292 A1 | 7/2005 | Saitoh et al. | |
| 2013/0087718 A1 | 4/2013 | Mei et al. | |
| 2014/0178169 A1 | 6/2014 | Hebert et al. | |
| 2018/0180550 A1* | 6/2018 | Franjic | G01N 21/474 |
| 2019/0212540 A1* | 7/2019 | Espensen | G02B 21/34 |
| 2020/0089986 A1 | 3/2020 | Finkbeiner et al. | |

OTHER PUBLICATIONS

"Fluorescence lifetime imaging of unstained tissues: early results in human breast cancer", Journal of Pathology J Pathol 199, (2003), 9 pgs.

Datta, Rupsa, "Fluorescence lifetime imaging microscopy: fundamentals and advances in instrumentation, analysis, and applications", Journal of biomedical optics 25.7, (2020), 44 pgs.

Isil, "The effect of cold ischemic time on the immunohistochemical evaluation of estrogen receptor, progesterone receptor, and HER2 expression in invasive breast carcinoma", Modern Patholgy vol. 25, (2012), pp. 1098-1105.

Lin, Oscar, "Rapid on-site evaluation using telecytology: A major cancer center experience", Diagn Cytopathol 47(1)., (Jan. 2019), 10 pgs.

Mcginty, James, "Wide-field fluorescence lifetime imaging of cancer", Biomedical Optics Express 640, (Aug. 19, 2020), 14 pgs.

Nie, Zhaojun, "Optical Biopsy of the Upper GI Tract Using Fluorescence Lifetime and Spectra", Front. Physiol., (May 13, 2020), 3 pgs.

Ouyang, Yuzhen, "FLIM as a promising tool for cancer diagnosis and treatment monitoring", Nano-Micro Letters 13.1, (2021), 1-27.

Zickus, V, "Wide-field Fluorescence Lifetime Imaging Microscopy with a High-Speed Mega-pixelImaging Microscopy with a High-Speed Mega-pixel SPAD Camera", bioRxiv preprint doi: https: doi.org 10.1101 2020.06.07.138685, (Jun. 8, 2020), 8 pgs.

"International Application Serial No. PCT US2022 082670, International Search Report mailed May 2, 2023", 3 pgs.

"International Application Serial No. PCT US2022 082670, Written Opinion mailed May 2, 2023", 6 pgs.

A. Esposito et al: "Unsupervised Fluorescence Lifetime Imaging Microscopy for High Content and High Throughput Screening", Molecular & Cellular Proteomics, vol. 6, No. 8, Jan. 1, 2007 (Jan. 1, 2007), pp. 1446-1454, XP055014370, ISSN: 1535-9476, DOI: 10.1074/mcp.T700006-MCP200 & Esposito Alessandro et al: "Unsupervised Fluorescence Lifetime Imaging Microscopy for High Content and High Throughput Screening—Supplemental Material", Molecular & Cellular Proteomics, May 21, 2007 (May 21, 2007), pp. 1-10, XP093251633, DOI: https://doi.org/10.1074/mcp.T700006-MCP200 URL:https://ars.els-cdn.com/content/image/1-s2.0-s1535947620321629-mmc1.pdf.

European Search Report dated Feb. 28, 2025 for European Patent Office Patent Application No. 22917623.5.

Garcia Edwin et al: "FLIM, FRET and high content analysis", Progress in Biomedical Optics and Imaging, SPIE—International Society for Optical Engineering, Bellingham, WA, US, vol. 11244, Mar. 2, 2020 (Mar. 2, 2020), pp. 1124417-1124417, XP060128624, ISSN: 1605-7422, DOI: 10.1117/12.2547517 ISBN: 978-1-5106-0027-0.

Sunil Kumar et al: "FLIM FRET Technology for Drug Discovery: Automated Multiwell-Plate High-Content Analysis, Multiplexed Readouts and Application in Situ", Chemphyschem, vol. 12, No. 3, Feb. 25, 2011 (Feb. 25, 2011), pp. 609-626, XP055062874, ISSN: 1439-4235, DOI:10.1002/cphc.201000874.

* cited by examiner

USING FLIM FOR BIOPSY BEFORE CHEMICAL FIXATION

CROSS-REFERENCE TO RELATED APPLICATION

This patent application claims the benefit of U.S. Provisional Patent Application No. 63/266,230, filed Dec. 30, 2021, entitled "SYSTEM AND METHOD FOR REAL-TIME PATHOLOGY OF TISSUE BIOPSIES USING FLUORESCENCE LIFETIME IMAGING MICROSCOPY (FLIM)", which is incorporated by reference herein in its entirety.

BACKGROUND

Delays in Biopsy Results

Tissue Biopsies are the current standard of care for definitive diagnosis of cancer. Biopsy to collect tissue samples followed by histopathology analysis of the samples, to identify changes in tissues caused by disease, is critical to both diagnose malignancy and determine patients' course of treatment. Despite being universally accepted as the standard of care, the current biopsy and pathology process is prone to several critical limitations that can adversely impact patient care and outcomes. These limitations, which are widely known and understood result from the time required to get clinically actionable results.

The current standard of practice typically takes up to five days for biopsy results to be returned to the doctor and patient. This delay generally is due to the time required by the biopsy-pathology workflow which includes processing the tissue samples for analysis, viewing and evaluating of the processed slides by a pathologist, and communicating results back to the surgeon and patient. This delay can have negative effects on the patient's treatment, potentially leading to unnecessary repeat procedures and thereby increasing patient risk and delaying the start of treatment which can adversely impact patient outcomes. This interval between the biopsy procedure and determining the findings has been associated with several undesirable effects including patient injury, increased cost of care, and poor-quality outcomes.

Increased patient injury can result from oversampling and from repeat procedures. Injury due to oversampling can be caused by taking unnecessary additional tissue samples. Due to the time required to get biopsy results, there is no way for the physician performing the procedure to know if a) the tissue removed contains cancer orb) if there is adequate cancer tissue in the sample to perform detailed analysis. Therefore, it is common practice to take multiple biopsies from different parts of the same tumor. This means that the physician will often remove more biopsy samples than clinically necessary. While oversampling ensures that a) the patient does not receive a false negative result due to only sampling an area without cancer cells present or b) that the lab has an adequate amount of tissue across all samples to complete histopathological analysis, each additional pass of the needle comes with additional risk to the patient. The risk of bleeding, damage to organs, infection and other complications increases without significant clinical benefit.

Injury due to repeat procedures can be caused by clinically unnecessary biopsy procedures. As with oversampling, this risk is caused by the fact that the physician performing the procedure cannot determine if enough tissue was removed for analysis. Following the initial procedure, if the pathologist determines that the original biopsy samples do not contain adequate tumor tissue for detailed analysis, the patient may be required to return to undergo a repeat biopsy procedure to collect more tissue. This subjects the patient to all the clinical risks associated with biopsy in a follow-up biopsy procedure to compensate for the fact that the original biopsy procedure failed to collect enough tissue for analysis. In many cases, the risks associated with repeat biopsies are higher than those for the initial procedure due to the impact of prior procedures on the tumor and surrounding anatomy, making it more difficult to collect samples safely.

To compensate for these risks, a procedure known as rapid on-site evaluation (ROSE) was developed. ROSE is generally performed when physicians are performing biopsies on high-risk organs such as pancreas, liver, and lung, but other regions may also undergo ROSE. ROSE procedures employ an on-site histopathology technician to transport the specimens to the pathology suite, where a quick analysis of the biopsy is performed to ensure appropriate tissue has been captured. The costs of implementing the ROSE procedure may involve hiring an extra pathologist, hiring a histopathology tech to transport tissue during the patient's biopsy, and several additional operational costs associated with its implementation. Given that a ROSE procedure typically requires additional personnel and additional procedural steps, and since the time spent by a pathologist performing ROSE is unpredictable, using ROSE can reduce the overall number of biopsies that can be assessed at a medical center within a given time period. See, Oscar Lin, MD, PhD, Dorota Rudomina, MBA, CT(ASCP), Rusmir Feratovic, MHA, CT(ASCP), and S. Joseph Sirintrapun, MD, Rapid on-site evaluation using telecytology: A major cancer center experience, *Diagn Cytopathol.,* 2019 January; 47(1): 15-19. doi:10.1002/dc.23925

The time required to get biopsy results also has an effect on the quality of outcomes for patients. This can be broken down further into two quality measures: quality of life and clinical outcomes. The effect upon quality of life caused by the time required for biopsy results is manifested through the impact on a patient's ability to enjoy normal life activities. Following a biopsy procedure, many patients report high levels of anxiety and distress while waiting for results. This causes a significant amount of stress to patients with already compromised health status and can negatively impact relationships, work, and overall quality of life. The longer the patient must wait for biopsy results, the more significant the impact of this anxiety and stress.

The effect upon clinical outcomes caused by the time required for biopsy results is manifested through the overall results of treatment. Patient care cannot commence until a diagnosis has been rendered. Studies have demonstrated that time to start treatment has a direct impact on the quality of outcomes for cancer patients. Even short delays to the start of treatment due to the time required for histology and pathology can impact a patient's individual response to treatment, and when looked at from a population health perspective, even relatively small delays to care can adversely impact survival rates.

FLIM

Fluorescence Lifetime Imaging Microscopy (FLIM) is a rapidly advancing technology with great promise for the detection of pathological cellular conditions such as cancer. See, Ouyang, Yuzhen, et al. (2021). FLIM as a Promising Tool for Cancer Diagnosis and Treatment Monitoring. *Nano Micro Lett* 13(133):1-27. doi: 10.1007/s40820-021-00653-z. The technology relies on detecting the relative decay of fluorescence between tissues to create image resolution. Extracted fluorescence lifetimes can reveal contrast across a sample, which would be otherwise un-seen from fluorescence intensity measurements only. Fluorescence decay is able to distinguish blood vessels from epithelial cells and collagenous tissue. Fluorescence is further able to distinguish oxidative stress, nucleic acids, and malignant stroma, revealing clues to metabolic changes indicative of disease processes. Single photon techniques can be used to distinguish cellular structures and tissue types while two-photon techniques reveal metabolic characteristics. Still, studies applying the techniques are limited and small in sample size. In particular, limited studies have examined the application of time-resolved fluorescence in diagnosis, in spite of the technique's potential.

McGinty et al have demonstrated that time gating can be used as effectively as a multi-photon approach to interrogate cancer tissues. McGinty et al have also shown that simple devices can be built to address FLIM needs in a clinical setting. Single photon UV radiation at the clinically relevant wavelength of 355 nm is safe on tissues that may require further analysis, such as biopsy tissue, due to the limited risk of direct DNA damage in the UVA spectrum. See, McGinty, James et al. (2010). Wide-field fluorescence lifetime imaging of cancer. *Biomed Opt Express* 1(2):627-640. doi: 10.1364/BOE.1.000627.

Fixation Time

The American Society of clinical oncology/College of American pathologist guideline recommendations for immunohistochemical testing of estrogen and progesterone receptors in breast cancer has stated that subjecting a tissue specimen to a prolonged cold ischemic time can result in antigenic degradation that can contribute to false negative results in cancer evaluation. To minimize the risk of false negatives, it recommends that fixation of a specimen within one hour or less is preferable. See, Patrick L. Fitzgibbons, MD, FCAP; James L. Connolly, MD, Template for Reporting Results of Biomarker Testing of Specimens from Patients with Carcinoma of the Breast, (2022) College of American Pathologists. However fixation of tissue is inimical to accurate FLIM analysis of the tissue. Thus, there exists a need to reduce the time for biopsy results and for an approach to FLIM analysis that can capture FLIM images within one hour. See, Isil, David, Rohit. The effect of cold ischemic time on the immunohistochemical evaluation of estrogen receptor, progesterone receptor, and HER2 expression in invasive breast carcinoma, *Modern Pathology* volume 25, pages 1098-1105 (2012).

SUMMARY

In one aspect a method is provided that includes positioning a slide that includes a concave region that is formed in a top surface of the slide and that can contain an object, such that a focal point of an objective lens of a fluorescence lifetime imaging microscopy (FLIM) device is within an area of the concave region between a bottom surface of the concave region and the top surface of the slide. The FLIM is used device to capture a sequence of wide field images of a portion of the object within a field of view of the objective lens.

In another aspect, a system includes one or more slides, each including a concave region suitable to contain an object, and each including identifying information thereon. The system includes a fluorescence lifetime imaging microscopy (FLIM) device that includes an objective lens. A reader is configured to read the identifying information included on the one or more slides. A is stage positioned opposite an objective lens of the FLIM device and positioned opposite the reader. A shuttle is moveably mounted to the stage and holding the one or more slides. One or more motors are configured to impart motion to the shuttle. A computing machine is configured with instructions to perform operations. The operations include causing the one or more motors to impart motion to the shuttle to position at least one of the slides held by the shuttle such that the reader can read the identifying information on the at least one slide. The operations include causing the reader to read the identifying information on the at least one slide. The operations include causing the one or more motors to impart motion to the shuttle, based upon the identifying information read by the reader, to vertically position the at least one slide relative to the objective lens such that a focal point of the objective lens is within an area of the concave region of the at least one slide between a bottom surface of the concave region and the top surface of the at least one slide. The operations include causing the FLIM device to capture a sequence of wide field images of a portion of an object within the concave region of the at least one slide that is within a field of view of the objective lens.

DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3A is an illustrative top perspective view of the example shuttle in a second position relative to the example stage.

DETAILED DESCRIPTION

Introduction

The basic principle of fluorescence is that when a fluorophore is excited to a higher energy state by absorbing one or more photons, it returns to its ground state through a radiative, a non-radiative or a combination of both processes. Fluorescence emission is a radiative process, which can be recorded by an apparatus, and a fluorescence decay curve can be fitted by an algorithm and derive the lifetime of fluorescence of one or more fluorophores. Characteristics of a fluorescence decay curve can be used to identify the presence and identity of fluorophores in cells. Cancer cells tend to have higher metabolic rates than normal cells, therefore the presence or density of certain fluorophores can be used as a basis to differentiate cancer cells from normal cells. Thus, fluorescence lifetime imaging can be used to detect and analyze cancer tissue samples derived from biopsy procedures.

A FLIM-based biopsy system is described that can be used to reduce if not eliminate oversampling and repeat biopsy procedures. It is contemplated that the system can be used to evaluate critical tissue while a patient is on the procedure table in lieu of utilizing a histopathologist as a rapid courier of tissue to the pathology lab. The inventors believe that utilizing optical proteomics can obviate the need for a pathologist to be assigned to a case in progress, improving the workflow within the pathology departments while providing reliable results to guide decision-making for the interventionalist medical personnel. The inventors believe that more rapid evaluation of ex-vivo tissue specimens using the FLIM-based biopsy system can be used to render a preliminary diagnosis more quickly during complex cases, reducing the risk the oversampling with a heavy needle presents to a patient. The inventors believe that not only will complications be reduced but the overall time needed to render a provisional diagnosis will also be reduced. The confidence level of having obtained an adequate amount of the target tissue will increase dramatically, which will directly reduce the need for repeat procedures.

FLIM-Based Biopsy System Overview

Figure 1:
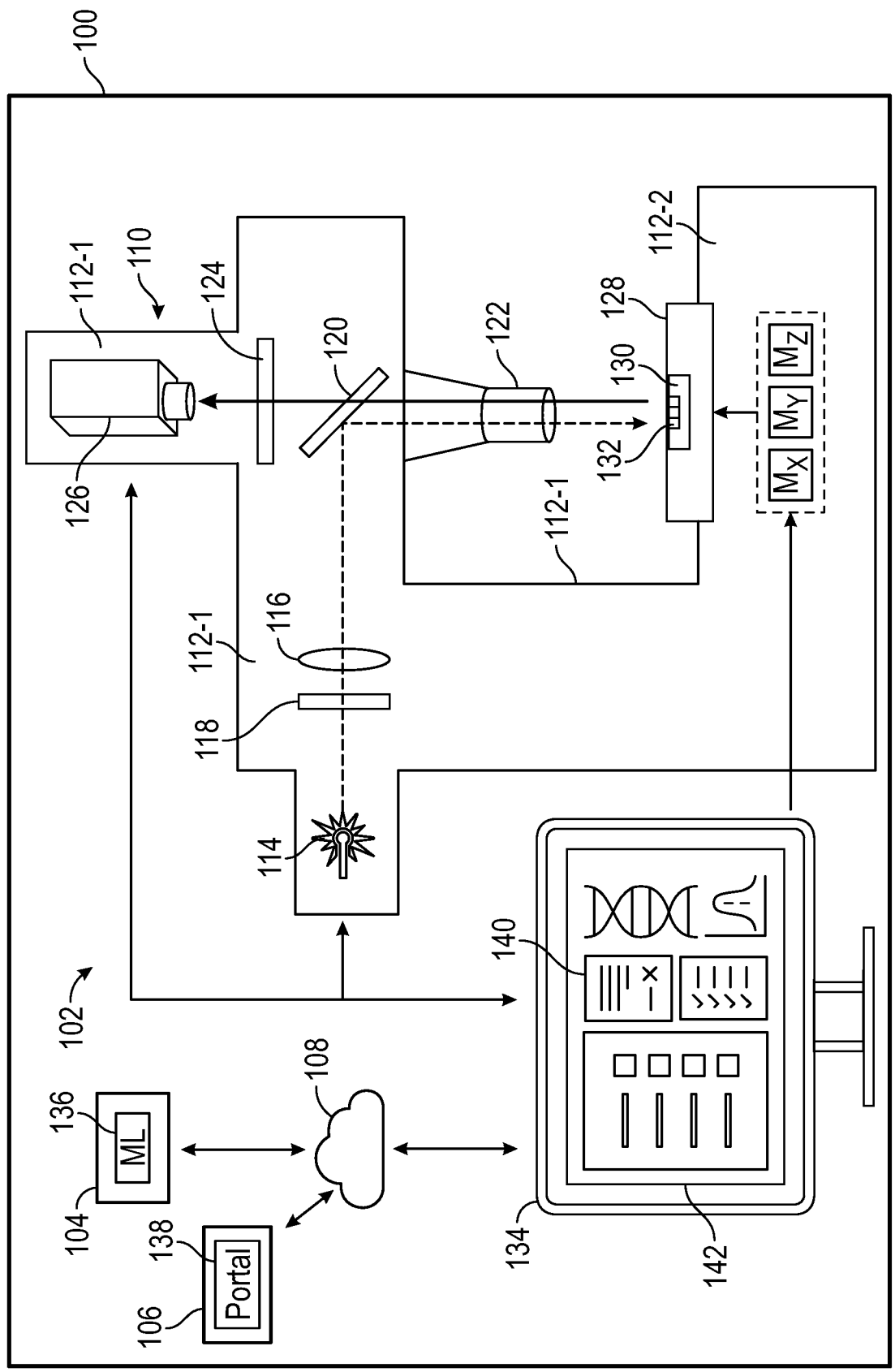
FIG. 1 is an illustrative drawing representing an example FLIM-based biopsy system in accordance with some embodiments.

FIG. 1 is an illustrative schematic drawing representing an example FLIM-based biopsy system 100 in accordance with some embodiments. The system includes an FLIM data capture system 102, a FLIM data analysis computing system 104, and a FLIM results reporting computing system 106. In an example system the FLIM data capture system 102, the FLIM analysis computing system 104, and the FLIM results reporting computing system 106 are configured to communicate over a network 108 such as the Internet.

An example FLIM data capture system 102 includes a fluorescence microscope used to capture data to produce a FLIM image. The example FLIM data capture system 102 uses a wide field fluorescence microscope 110 to capture a snapshot of an entire field of view. Wide field microscopy involves illumination of an entire field of view as compared with pixel-by-pixel illumination. A FLIM image can be use to produce a FLIM graph, which can include a pseudo-color-coded image of an object, such as anatomical tissue, in which different colors represent different illumination lifetimes associated with the pixel locations in the image.

More particularly, the example FLIM data capture system 102 includes is a wide field fluorescence microscope 110 that includes a fixture 112-1, 112-2 that includes an optics section 112-1 and a stage section 112-2 that includes a shuttle controllable for two dimensional and/or three dimensional motion. The fixture optics section 112-1 holds an excitation light source 114, a focusing lens 116, a first light filter 118, a dichroic beam splitter 120, an objective lens 122, a second light filter 124, a light detector 126, and a slide information reader (not shown). An example excitation light source 114 can be a laser or LED light source capable to emit single-wavelength photons. An example excitation light wavelength is in a range between 300 nm to 500 nm, and preferably in a range between 300-450 nm. A computing machine 134 can programmatically control the light source 114 so that the intensity of light varies over time, such as in a sine wave. The focusing lens 116 collimates the excitation light to encompass a wide field of view. An example detector 126 can include a gated CMOS or CCD camera for recording the fluorescence for several tens to several hundred nanoseconds. The first light filter 118, which is located in front of the excitation light source 114, is used to filter out unwanted wavelengths. An LED excitation light source, for example, often produces a mix of various wavelengths, some of which may be outside a desired excitation wavelength range. The second light filter 124, which is located in front of the detector 126, is used to exclude reflected excitation wavelength light.

The FLIM data capture system 102 includes a moveable shuttle 128 located upon the fixture stage section 112-1 on which to mount one or more slides 130 (only one shown) to contain objects 132, such as biopsy specimens during imaging by the fluorescence microscope. An example FLIM data capture system 102 includes multiple motors Mx, My, and Mz, coupled to control three-dimensional motion of the shuttle relative to the fixture sections 112-1, 112-2. Each slide 130 contains slide identifier/parameter information 607 that is communicatively accessible for reading by the reader. For example, the slide i identifier/parameter information 607 may be etched into or printed upon the slide. The slide identifying information uniquely identifies the slide, via a unique code for example, and can be used as a basis to uniquely track an object, such as a biopsy specimen, held by the slide 130. The slide parameter information provides indicia of slide dimensions including dimensions of one or more concave regions, discussed below, formed in the slide. The slide parameter information can be used as a basis to control operation of the shuttle motors Mx, My, and Mz, the excitation source 114, and the detector 126 during imaging of a specimen 132 held by the slide 130. The reader reads a slide's identification/parameter information 607 during a fine tuning setup process to configure the FLIM data capture system 102 for imaging a specimen held by the slide. The FLIM data capture system 102 includes a computing machine 134 coupled to control the excitation light source 114, the detector 126, the reader (not shown), and the shuttle motors Mx, My, and Mz. The computing machine 134 is configured to send FLIM data captured at the light detector 126 over the network 108 to the FLIM data analysis computing system 104.

An example FLIM data analysis computing system 104 is configured to evaluate FLIM data received over the network from the FLIM data capture system 102. It is contemplated that the FLIM data analysis computing system 104 uses a trained machine learning engine 136 to evaluate the captured FLIM data and to produce FLIM evaluation results that include indications of the likelihood that FLIM data captured for a biopsy specimen contains cancer cells. It is contemplated that wide-field image frame data captured during FLIM image scanning will be used to train a back-propagation deep neural network model to classify regions, in a FLIM scan of a tissue specimen captured using the FLIM data capture system, as containing cancer tissue or as not containing cancer tissue. In an alternative embodiment of the invention, a traditional method such as a curve-fitting algorithm can be used to derive the lifetime of each pixel in micrograph, and use such data to determine whether cancer tissue is present in the field of view. The FLIM data analysis computing system 104 is configured to provide the FLIM evaluation results to the FLIM results reporting computing system 106.

An example FLIM results reporting computing system 106 includes a web portal 138 configured to download FLIM results for display at a display screen of a computer that has permission to access the FLIM results. The web portal 138 may include one or more Internet cloud-based computing machines (not shown) configured to present FLIM results 140 in a format suitable for display at a display screen 142 of computing machine 134 co-located with a patient's care team, or at another computer (not shown) that has permission to access the FLIM results. Moreover, it is contemplated that after the FLIM data capture system 102 captures FLIM data from a patient's biopsy specimen, the slide 130 containing the specimen 132 can be removed from the shuttle 128 and then provided to a conventional pathology department at a medical organization. The specimen 132 can be chemically fixed, using formalin for example, and subjected to conventional pathology by a histologist. Information containing results of a conventional pathology evaluation for a specimen, which does not involve FLIM imaging, may be correlated to FLIM results based upon the unique slide identifying information for the slide containing the specimen. The conventional results information, which does not involve FLIM imaging, may be uploaded to the FLIM results reporting system so that they can be accessed over the network at a display screen of a computer that has permission to receive the results. Significantly, however, it is contemplated that the FLIM results will be available at the FLIM results reporting system much sooner than the conventional pathology results. It is noted that slide 130 need not include patient identifying information, and therefore, no patient identifying information need be provided to the FLIM data analysis computing system 104 or to a conventional pathology department. Hence, patient anonymity and privacy can be maintained in accordance with medical regulations.

Shuttle's Passage within Reader FOV and Objective Lens FOV

Figure 2A:
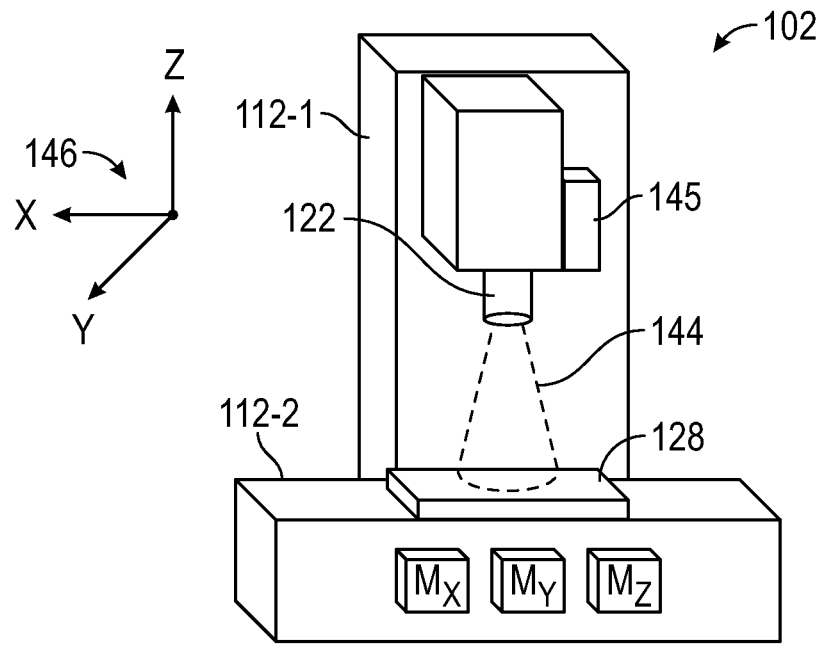
FIG. 2A is an illustrative perspective view of the example wide field fluorescence microscope showing the moveable shuttle mounted upon the stage at a position within a field of view of an objective lens.
Figure 2B:
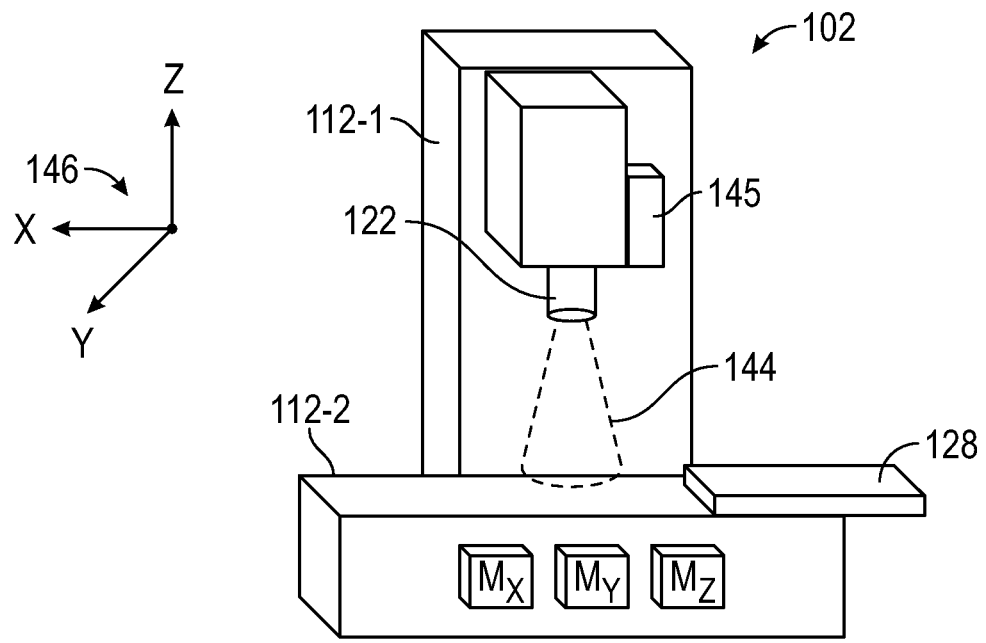
FIG. 2B is an illustrative perspective view of the example wide field fluorescence microscope showing the moveable shuttle mounted upon the stage at a position outside the field of view of the objective lens.

FIGS. 2A-2B show an objective lens 122 and the reader 145 positioned opposite the shuttle 128. FIG. 2A is an illustrative perspective view of the FLIM data capture system 102 showing the moveable shuttle 128 slidably mounted upon the stage section 112-2 positioned within a field of view (FOV) 144 of the objective lens 122. FIG. 2B is an illustrative perspective view of the FLIM data capture system 102 FLIM data capture system 102 showing the moveable shuttle 128 mounted upon the stage section 112-2 at a position outside the FOV 144 of the objective lens 122. The motor is controllably configured to cause the shuttle to move laterally parallel to the x-axis indicated in the illustrative Cartesian coordinate system 146 in predetermined increments across the FOV 144 of the objective and across the FOV of the reader 145. In an example FLIM data capture system 102, one or more x-axis motors cause the shuttle 128 to move across the stage section 112-2 parallel to an x-axis of the example coordinate system 146. In an example FLIM data capture system 102, from the perspective shown in FIGS. 2A-2B, the motor causes the shuttle to move first through an FOV (not shown) of the reader 145, which reads slide identifying information and slide identifier/parameter information 607 presented using the slide. One or more z-axis motors can adjust the vertical z-axis position of the shuttle 128 relative to the objective 122 to set a focal point of the objective to a predetermined location within biological tissue within a concave region of the slide. One or more x-axis motors then move the slide to within a FOV 144 of the objective 122 for imaging. In the perspective view shown in FIGS. 2A-2B, the slide moves from right to left.

Figure 3A:
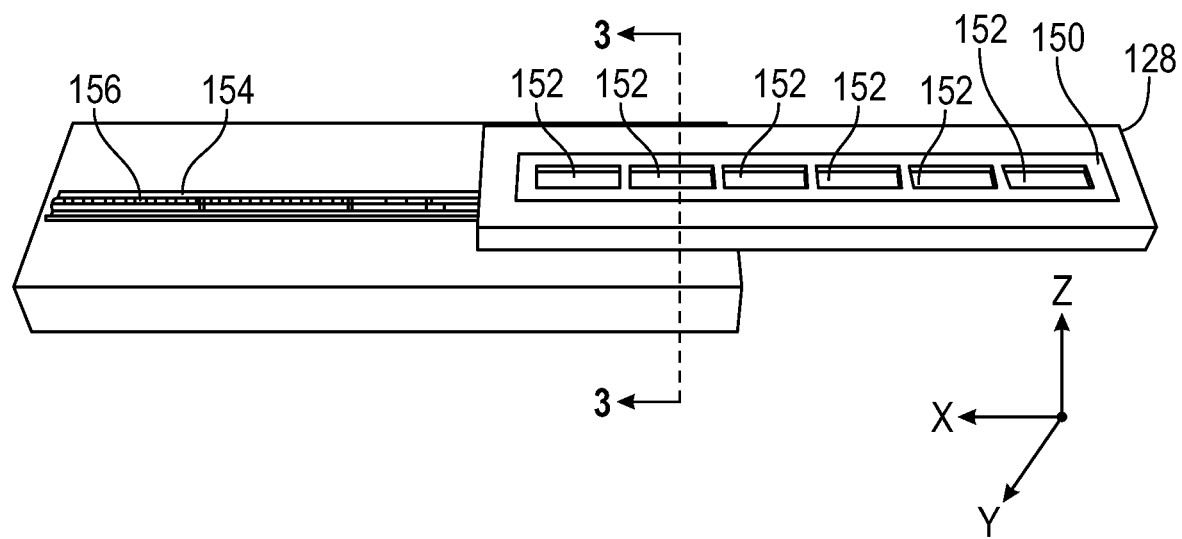
FIG. 3A is an illustrative top perspective view of an example shuttle in a first position relative to an example stage.
Figure 3B:
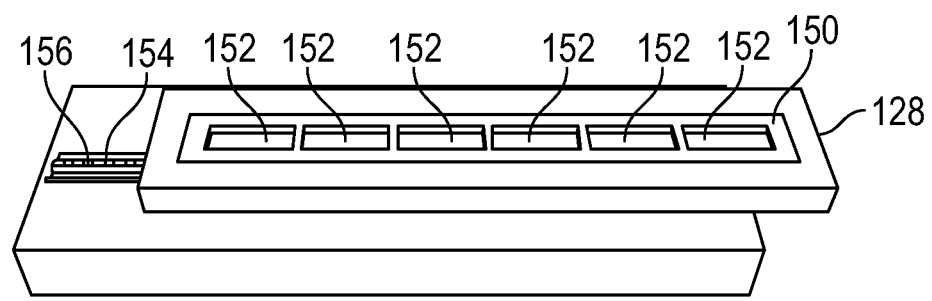
Figure 4:
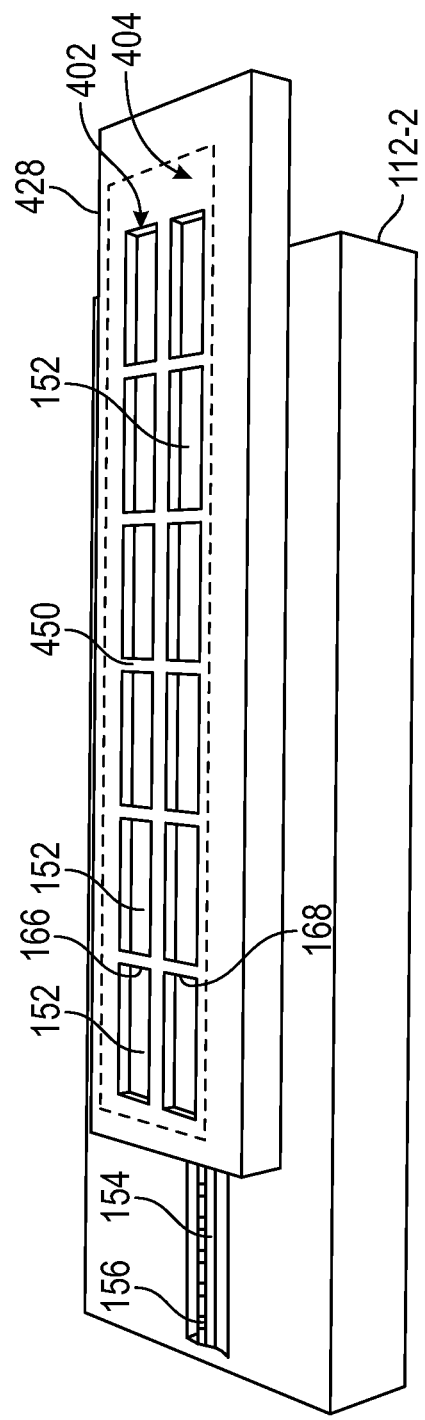
FIG. 4 is an illustrative top perspective view of an example shuttle containing multiple rows of slide-receiving recesses.

FIG. 3A is an illustrative top perspective view of an example shuttle 128 in a first x-position relative to an example stage section 112-2. FIG. 3B is an illustrative top perspective view of the example shuttle 128 in a second x-position relative to the example stage section 112-2. FIG. 4 is an example cross-section view of the shuttle 128 and stage section 112-2 along line 3-3 in FIG. 3A. Referring to FIGS. 3A-3B and FIG. 4, the example shuttle 128 defines a recess 148 in which a slide tray 150 may be snuggly inserted and held. The tray 150 in turn includes multiple slide-receiving recesses 152, each sized to snuggly receive and hold a slide. In an example tray 150 installed for slidable motion across the objective FOV 144, the slide-receiving recesses 152 are aligned in a sequence parallel to the x-axis. Thus, the example shuttle 128 can hold multiple different slides 130 that can each contain a different biopsy tissue specimen 132. The example stage section 112-2 includes an elongated slot 154 that extends in the x-axis direction along a length of the stage section 112-2. The slot acts as a mechanical guide that defines a predetermined path for the shuttle and for slides 130 that can be received within the recesses 152 to follow when the x-axis motor Mx causes the shuttle 128 to move parallel to the x-axis relative to the stage section 112-2. A drive axle/screw 156 extends within the slot 154 and is operatively coupled to drive the shuttle parallel to the x-axis.

FIG. 4 is an illustrative top perspective view of an example shuttle 428 containing two rows 402, 404 of slide-receiving recesses 152. The shuttle 428 is shown slidably mounted to an example stage section 112-2 within a slot 154. The first and second rows 402, 404 of slide-receiving recesses 152 are formed within a slide tray 450 inserted within the shuttle 428. The first and second rows 402, 404 of slide-receiving recesses 152 each extend laterally parallel to the x-axis. The first and second rows 402, 404 are located side-by-side and are offset laterally from one another parallel to the y-axis. A pair of y-axis motors My1, My2 can impart y-axis motion to the shuttle to selectably align slides from one or the other of the rows with the reader 145 and the objective 122 for reading and scanning, respectively.

Moreover, it is noted that in the event that a sample is too wide, laterally, to be scanned in a single lateral x-direction pass of a slide 130 of the specimen through the objective FOV 144 using the x-axis motor Mx, the y-axis motors My1, My2 can be used to laterally shift an y-axis position of the shuttle 128 or 428 so that a portion of the specimen that was not imaged in the first x-direction pass beneath the objective 122, can be imaged in a second x-direction pass of the specimen beneath the objective 122.

Figure 5A:
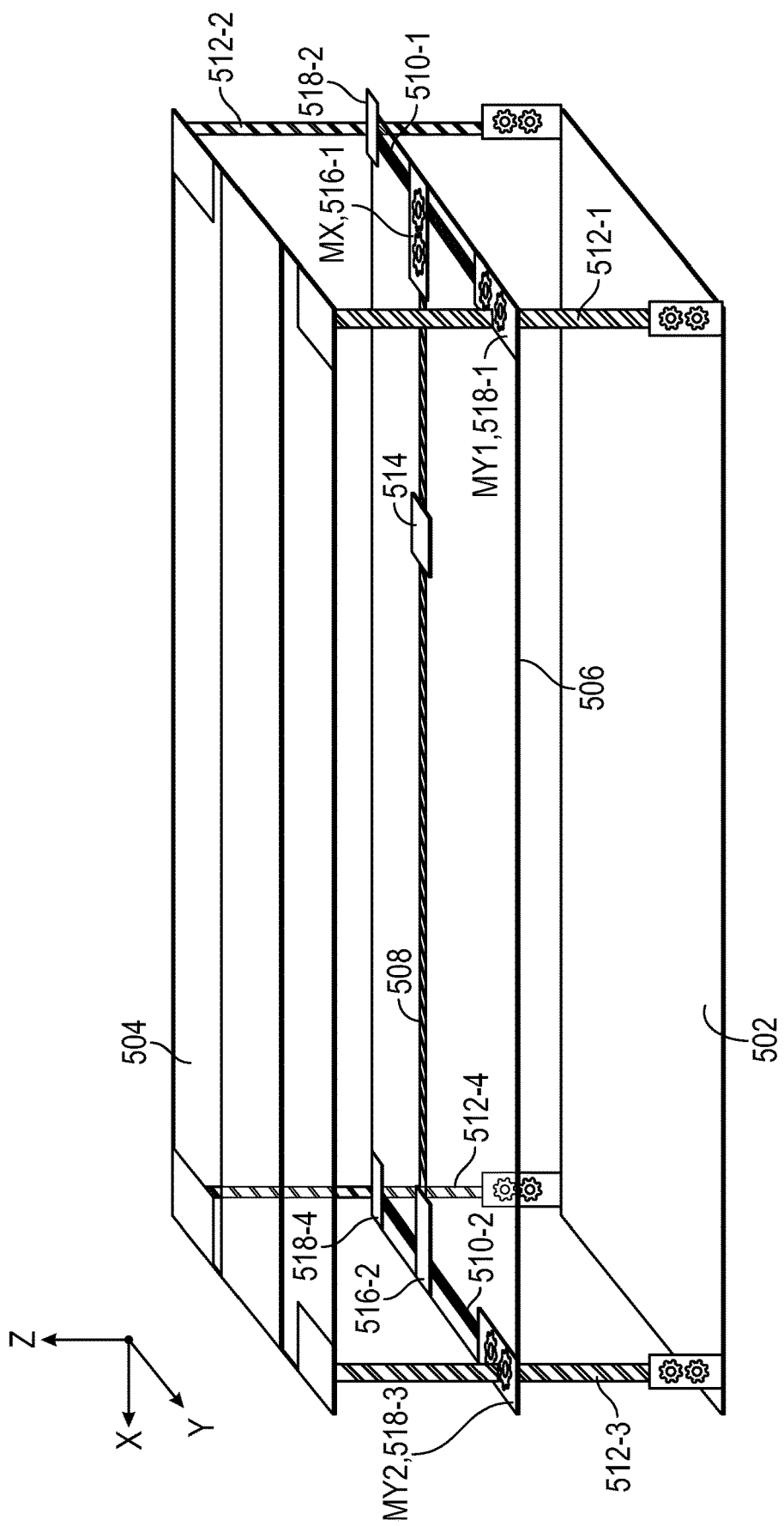
FIG. 5A is an illustrative schematic perspective view of an example three-dimensional drive system located within the stage section in accordance with some embodiments.
Figure 5B:
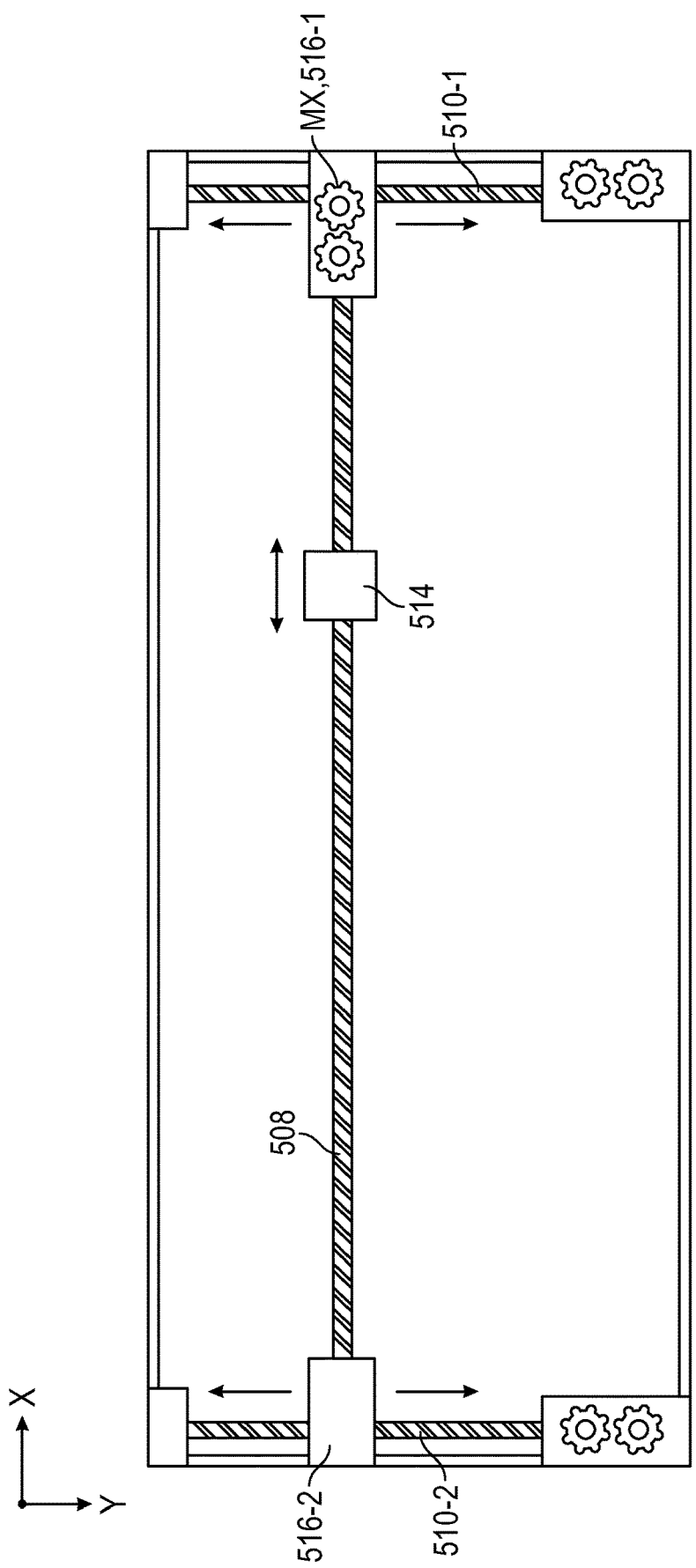
FIG. 5B is an illustrative top elevation view of the three-dimensional drive system.

FIG. 5A is an illustrative schematic perspective view of an example three-dimensional drive system 500 located within the stage section 112-2 in accordance with some embodiments. FIG. 5B is an illustrative top elevation view of the three-dimensional drive system 500. The stage section 112-2 includes a rectangular base plate 502, a rectangular top plate 504, and a rectangular motor frame 506, which extend parallel to one another in different planes, with the motor frame 506 located between the base plate 502 and the top plate 504. A slot 154, described above, is formed in the top plate 504. The three-dimensional drive system 500 includes an x-axis motor Mx coupled to an x-axis drive axle/screw 508. The three-dimensional drive system 500 includes two y-axis motors My1-My2, each coupled to a different respective y-axis drive axle/screw 510-1, 510-2. The three-dimensional drive system 500 includes four z-axis motors Mz1-Mz4, each coupled to a different respective z-axis drive axle/screw 512-1 to 512-4, respectively. The example motor frame 505, itself, has no solid sides and is defined by the operative interconnection of the x-axis drive axle/screw 508, the y-axis drive axle/screws 510-1, 510-2 and the z-axis drive axle/screws 512-1 to 512-4. The motor frame 506 mounts the x-axis motor Mx, the y-axis motors My1, My2 and the z-axis motors Mz1, Mz2, Mz3, and Mz4, which cooperate to move the shuttle in x-axis, m y-axis, and z-axis directions. The x-axis motor Mx and the x-axis drive screw 508 are configured to cause a shuttle 128 or 428 to move in directions parallel to the x-axis. More particularly, the x-axis drive axle/screw 508 extends parallel to the x-axis and is operatively coupled to an x-axis traveling nut assembly 514, which is configured to releasably engage a bottom portion of the shuttle 128. The x-axis traveling nut assembly 514 is configured to move along the x-axis in response to rotation imparted to the x-axis drive axle/screw 508 by the x-axis motor Mx. The shuttle 128 or 428 moves parallel to the x-axis in unison with the x-axis direction movement of the x-axis traveling nut assembly 514.

The first and second y-axis motors My1, My2 and respective first and second y-axis drive axle/screws 510-1, 510-2 are configured to move the shuttle 128 or 428 and the x-axis motor Mx together with its x-axis drive axle/screw 508 in directions parallel to the y-axis. The y-axis drive axle/screws 510-1, 510-2 extend parallel to the y-axis. Each end of the x-axis drive axle/screw is operatively coupled to a different respective y-axis traveling nut assembly 516-1, 516-2. The first and second y-axis motors My1, My2 are configured to operate in unison to impart identical torque to the respective y-axis traveling nut assemblies 516-1, 516-2 to cause them to move in unison parallel to the y-axis and to thereby cause the x-axis motor Mx, the x-axis drive axle/screw 508, and the shuttle 128 operatively coupled thereto to also move in in unison parallel to the y-axis.

The z-axis motors Mz1, Mz2, Mz3, and Mz4 and their respective z-axis drive axle/screws 512-1 to 512-4 are configured to move the motor frame 506 in directions parallel to the z-axis. It will be appreciated from the explanation above that the example shuttle 128 or 428 is operatively coupled via the x-axis traveling nut assembly 514 to move in unison with the motor frame 506. Each of first to fourth z-axis drive axle/screws 512-1 to 512-4 extends parallel to the z-axis between a different pair of corners of the base plate 502 and the top plate 504. Each z-axis drive axle/screw is operatively coupled to a different respective z-axis traveling nut assembly 518-1, 518-4 that is operatively coupled to a different end portion of one or the other of the respective first and second y-axis traveling nut assembly 516-1, 516-2. More particularly, a first z-axis traveling nut assembly 518-1 is operatively coupled to a first end portion of the first y-axis drive axle/screw 510-1, and a second z-axis traveling nut assembly 518-2 is operatively coupled to a second end portion of the first y-axis drive axle/screw 510-1. A third z-axis traveling nut assembly 518-3 is operatively coupled to a first end portion of the second y-axis drive axle/screw 510-2, and a fourth z-axis traveling nut assembly 518-4 is operatively coupled to a second end portion of the second y-axis drive axle/screw 510-2. The four z-axis motors Mz1-Mz4 operate in unison to impart force to move the motor frame 506, and the shuttle 128 or 428 operatively coupled thereto, in directions parallel to the z-axis.

Slide

Figure 6A:
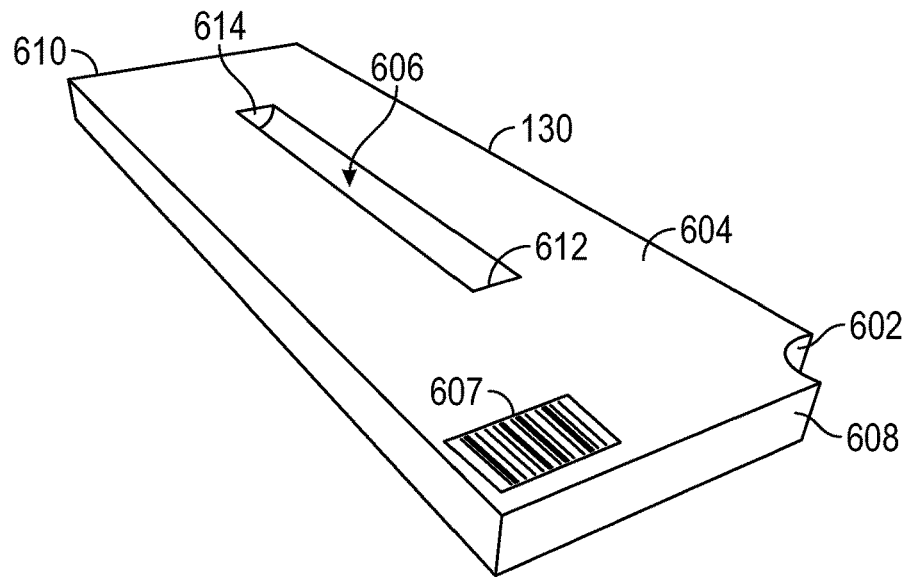
FIG. 6A is an illustrative top perspective views of an example slide.
Figure 6B:
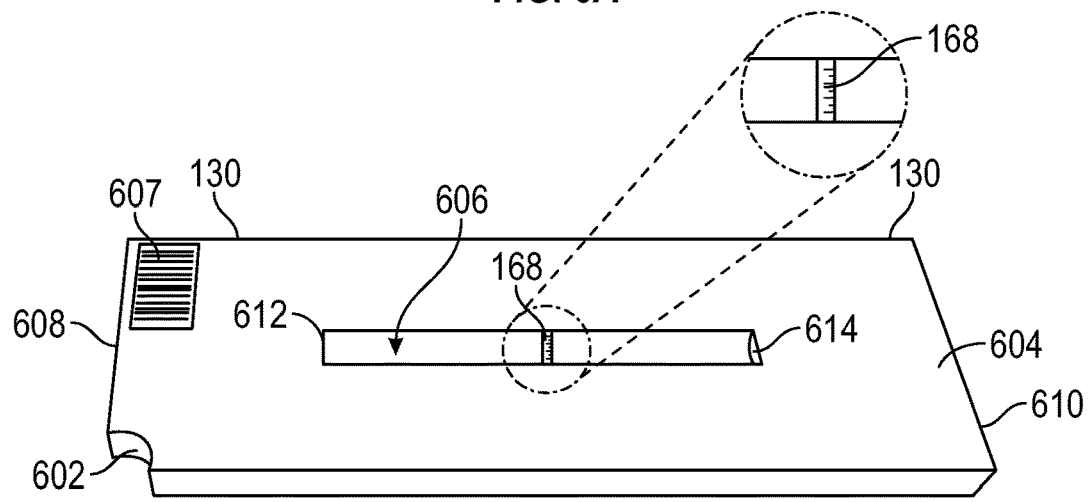
FIG. 6B is an illustrative side perspective view of the example slide.
Figure 6C:
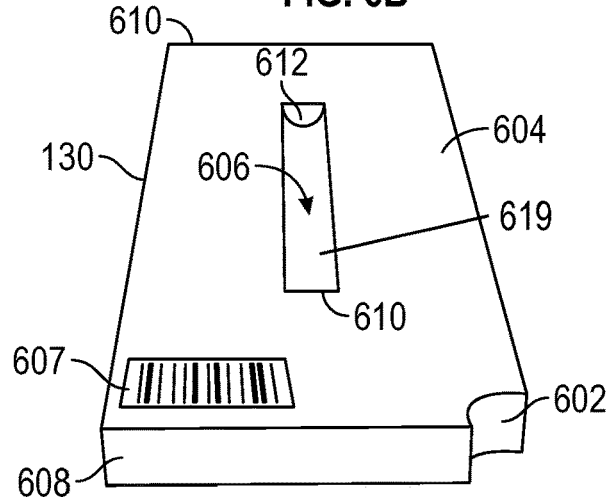
FIG. 6C is an illustrative end perspective view of the example slide.

FIG. 6A is an illustrative top perspective views of an example slide 130. FIG. 6B is an illustrative side perspective view of the example slide 130. FIG. 6C is an illustrative end perspective view of the example slide 130. The example slide is formed of a material that does not autofluoresce or create artifacts and may be a clear laboratory glass, polycarbonate, or similar compound. Example slide is shaped to fit snugly within a shuttle recess 152. An example slide 130 includes a notch 602 that acts as an alignment feature to ensure proper orientation and position of the slide within a shuttle recess 152. The example slide has a generally rectangular shape with dimensions clinically suited to receive biopsy tissue specimens. More particularly, the slide 130 has a generally smooth flat top surface portion 604. A concave region 606 is formed in the top surface 604. The concave region has dimensions clinically suited to receive a biopsy tissue specimen with a top surface of the specimen not extending outward from within the concave region 606 higher than a level of the top surface portion 604 of the slide 130. The concave region 606 is shaped to hold a tissue specimen in a predetermined location relative to the overall slide 130 and may vary in shape and size according to the type of biopsy being performed. The recess has a bottom surface 619. Since the slide is secured within a shuttle recess 152 in the shuttle 128 or 428 as the shuttle moves across the objective FOV 144, the slide's concave region 606 and a tissue specimen therein can be moved across the objective FOV 144.

In operation, during movement of the shuttle 128 or 428 across the objective FOV 144, a slide leading edge 608 first passes through the objective FOV 144. A concave region leading edge 612 next passes through the objective FOV 144. A concave region trailing edge 614 next passes through the objective FOV 144. A slide trailing edge 610 next passes through the objective FOV 144.

An example slide 130 that is configured to receive a needle biopsy has an elongated concave region 606 into which a specimen can be placed. This ensures that needle biopsy specimens are positioned consistently on all needle biopsy slides. More particularly, an example slide configured to receive a needle biopsy has a depth corresponding to the approximate interior diameter of the biopsy needle selected to hold a biopsy specimen approximately level with a surrounding smooth flat top surface portion of the slide and is long enough to accommodate a needle biopsy sample. An example slide configured to receive a needle biopsy taken using a 14-gauge needle has depth of about 1.60 mm. An example slide configured to receive a needle biopsy taken using a 16-gauge needle has a depth of about 1.194 mm. An example slide configured to receive a needle biopsy taken using an 18-gauge needle has a depth of about 0.838 mm. An example slide configured to receive a needle biopsy taken using a 20-gauge needle has a depth of about 0.603 mm. An example concave region has a length of about 40 mm.

Alternatively, a concave region 606 of an example slide can have a hemispherical concave cup shape to accommodate different biopsy specimens, slices of tissue or punch biopsy specimens, for example.

An example slide 130 can have identifying/parameter information 607 applied thereto that indicate a slide's configuration including recess type/shape and position of recess on the slide, and that can be used to correlate the findings to the patient from whom a biopsy sample is taken. In an example slide 130, the identifying/parameter information 607 is provided in a barcode format. Alternatively, the identifier/parameter information 607 can be provided in a QR code format or using an RFID tag, for example. Example identifier/parameter information 607 can be implemented as a barcode or QR code that can be imprinted onto the slide or can include an RFID tag, for example. Slide identifying information can include a unique serial number that is generated during the manufacturing process that identifies the slide. Slide parameter information can include indicia of slide dimensions such as dimensions (e.g., length, width, depth, and/or contour) of a concave region 606 of the slide 130, distance of a start of the concave region 606 from a leading edge of the slide 130 and distance of a trailing edge of the channel 606 from a leading edge or a trailing edge of the slide 130. The identifying/parameter information 607 can be read by the reader prior to the slide entering the objective FOV 144 and can be used to configure the FLIM data capture system 102, based upon slide parameters, to image a sample contained within the concave region 606 of the slide 130.

The concave region 606 of an example slide 130 can include depth gauge information 610 for use during fine tuning a z-dimension coordinate prior to scanning. The depth gauge information 610 includes markings 616 formed as hatch marks spaced apart by known interval amounts. The depth gauge information can be used by auto focus mechanism, for example to ascertain depth of a surface of a tissue sample within the concave region 606, which in turn can be used as an alternative mechanism to adjust objective lens depth of focus.

Hardware Configuration

Figure 7:
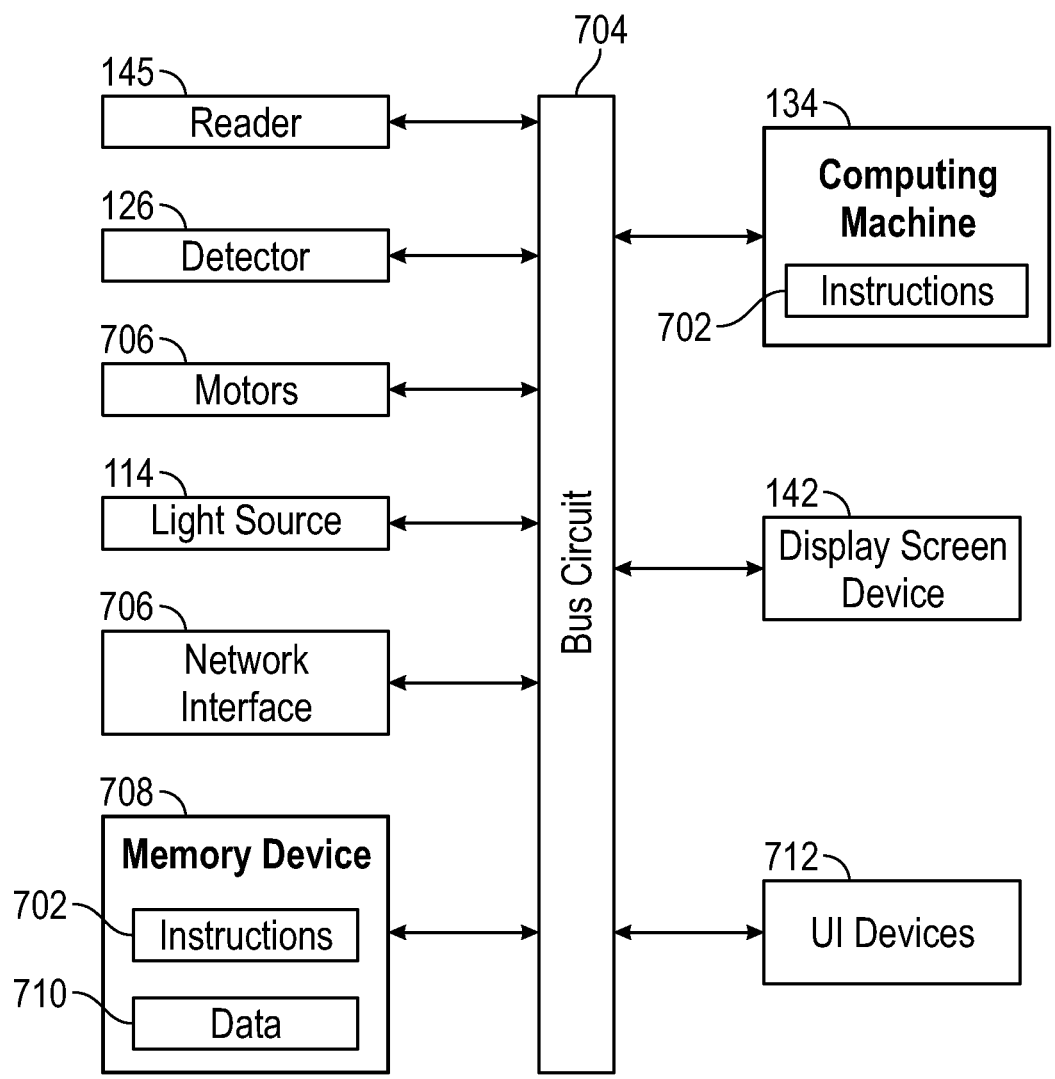
FIG. 7 is an illustrative block diagram of an example hardware configuration in which a computing machine is coupled to control a FLIM data capture system.

FIG. 7 is an illustrative block diagram of an example hardware configuration in which a computing machine 134 is coupled to control the FLIM data capture system 102. The computing machine 134, or variations thereof, is configured using instructions 702 executable by a computing machine, which may include processor circuitry configurable to control the components of the FLIM data capture system 102. The computing machine 134 may contain microcircuits that are configurable, temporarily or permanently, by some or all of the instructions such that the computing machine is operable to perform any one or more of the methodologies described herein, in whole or in part. For example, a set of one or more microcircuits of the processor may be configurable to execute one or more modules (e.g., software modules) described herein. The computing machine, which may store instructions 702, is coupled via a bus circuit 704 to communicate with the reader 145, the detector 126, motors 706, the excitation light source 114, a network interface 708, a memory device 708 that stores instructions 702 and data 710, a screen display 142, and user interface devices 712, such as mouse and keyboard.

Software-Based Slide Models

Figure 8A:
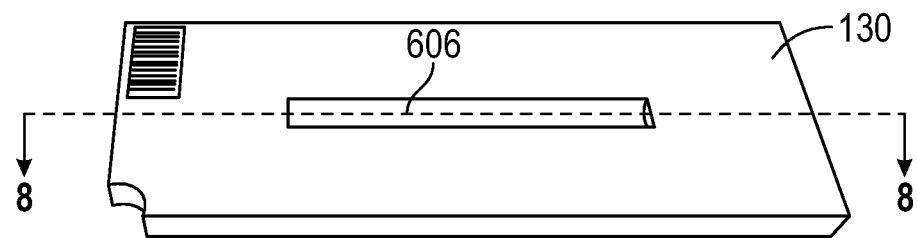
FIG. 8A is an illustrative top perspective view of the slide with a concave region formed therein.
Figure 8B:
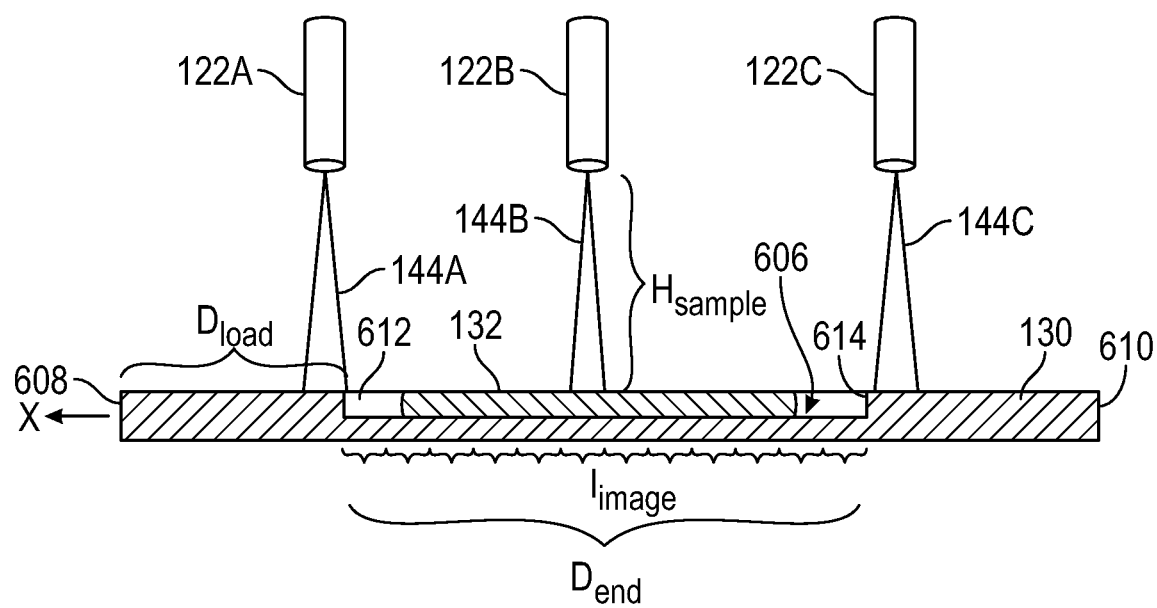
FIG. 8B is an illustrative longitudinal cross-section view along line 8-8 in FIG. 8A. with a tissue sample present in the concave region

FIG. 8A is an illustrative top perspective view of the slide 130 with a concave region 606 formed therein. FIG. 8B is an illustrative longitudinal cross-section view along line 8-8 in FIG. 8A. FIG. 8B shows the objective lens at a start of scan position 122A, at a mid-scan position 122B and at an end of scan position 122C. The drawing in FIG. 8B is annotated to show slide parameter information used to fine-tune operation of the FLIM data capture system 102 for the slide currently being scanned. A $D_{load}$ value represents a start image scan distance, which is an x-dimension distance shift from a slide leading edge 608 to a concave region leading edge 612. The $D_{load}$ value indicates a lateral x-axis distance that the shuttle 128 or 428 must move in order to transition from a position in which the slide leading edge 608 is within the objective FOV 144 to a position in which a leading portion of the tissue within the concave region 606 is within the objective FOV 144 and image scan should begin.

An $H_{sample}$ value represents sample height. The shuttle $H_{sample}$ value indicates a z-position of the shuttle required to position a focal point of the objective 122 at a prescribed depth location within tissue held within the channel. It is noted that in the example FLIM data capture system 102, the object lens is fixed and focal point of the objective lens relative to a sample is adjusted by moving the slide closer or farther from the objective in the vertical z-axis direction. In an example embodiment, the prescribed depth location is one-half of the depth of the concave region 606 such that a distance from the objective to a center of the specimen is equal to $H_{sample}$.

A $D_{end}$ value represents an end image scan distance, which is an x-dimension distance shift from a start scan position at the concave region leading edge 612 to an end scan position at the concave region trailing edge 614. The $D_{end}$ value indicates a lateral x-axis distance that the shuttle moves while the concave region 606 objective FOV 144. The $D_{end}$ value indicates an x-axis distance that the shuttle 128 or 428 must move in order to transition from a position in which the concave region leading edge 612 is within the objective FOV 144 to a position in which a no portion of the tissue within the concave region 606 is within the objective FOV 144 and image scan should stop.

An $I_{image}$ value indicates an x-axis direction shift of the shuttle between images to cover the length of the concave region with the fewest number image scans. A change in the z-axis distance between a slide 130 and the objective lens 122 can change imaging field width. The imaging field width may not be large enough to image an entire sample in a single FLIM image scanning sequence. The $I_{image}$ value indicates the width of the imaging field for a slide, which can be used to determine the optimal length of lateral x-direction movement of the shuttle 128 or 428 between FLIM image scanning sequences to achieve imaging of an entire specimen with the fewest number of FLIM image scanning sequences. Thus, the $I_{image}$ value can be used to determine lateral-distance step size of movements from one wide field view of a specimen portion to a widefield view of the next portion of the specimen to be imaged. The step size in turn can be used as a basis to control movement imparted by the x-axis motor Mx and movement imparted by the y-axis motors My1, My2. The memory device 708 stores a database that includes model data for different types of slides that correspond to different types of biopsies. In an example FLIM data capture system 102, the slide database includes information indicated in Table 1 for each type of slide.

TABLE 1

Figure 9:
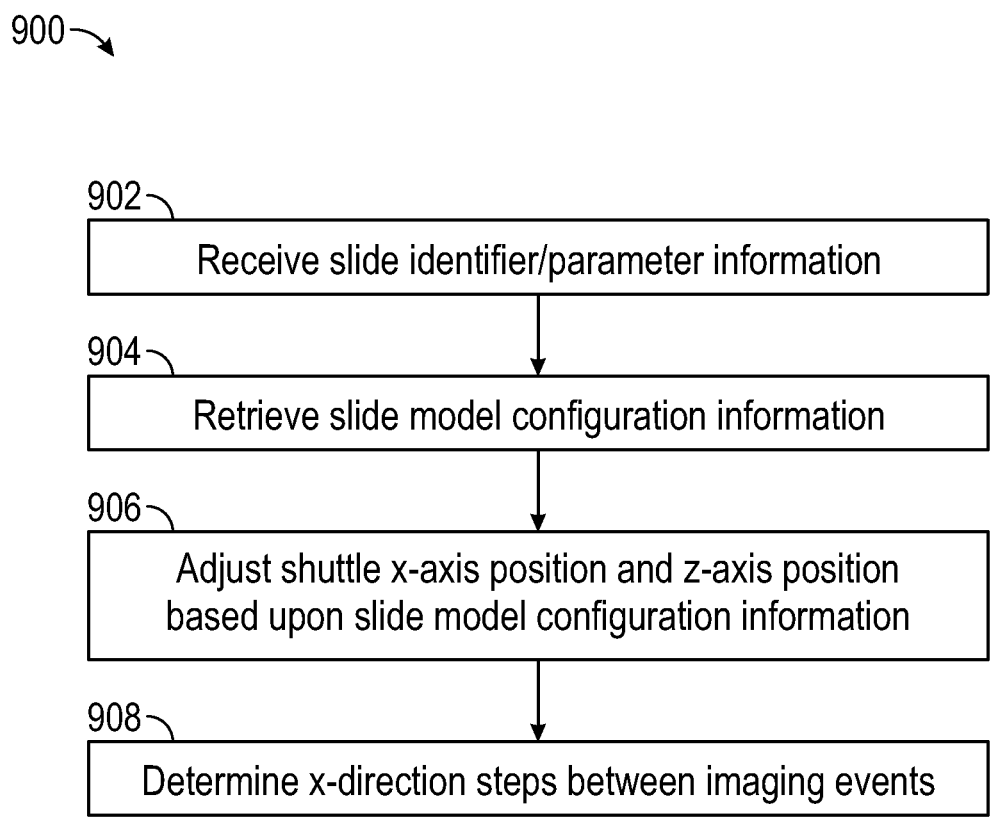
FIG. 9 is an illustrative flow diagram representing an example process to configure the FLIM data capture system to image a biological specimen within a concave region of a slide using slide-based information.

Slide model description - e.g. 14-gauge needle biopsy slide
Slide length
Slide height
Slide width
Width of concave region
Length of concave region
$D_{load}$
$H_{sample}$
$D_{end}$
$I_{image}$ Slide-Based FLIM System Configuration FIG. 9 is an illustrative flow diagram representing an example process 900 to configure the FLIM data capture system 102 to image a biological specimen within a concave region 606 of a slide 130 using slide-based information. Different slides may have different dimensions to hold specimens of differentiating shapes and sizes. Different configurations of the FLIM data capture system 102 are required for accurate imaging of specimens of different sizes and different shapes. Thus, the configuration process can be performed for each slide that passes across the objective FOV 144. The configuration process can be implemented using one or more computing machines 134 configured with executable instructions 702 to perform the following operations.

Operation 902 can occur as a shuttle moves the slide into a FOV of the reader 145 prior to entering the objective FOV 144 field of view. An example operation 902 uses the reader 145 to receive identifying/parameter information 607 encoded on the slide (e.g., via bar barcode, QR code, or RFID). As explained above, an example FLIM data capture system 102 can store a database of slide models in the memory device 708 that can be used to implement different FLIM data capture system configurations for different categories of slides. The reader 145 reads the information presented using the slide.

Operation 904 retrieves slide model information from the memory device 708 that corresponds to identification/parameter information 607 received at the reader 145.

Operation 906 adjusts the shuttle's x-axis and z-axis positions, based upon the slide model configuration information, prior to commencing FLIM imaging. Operation 906 uses the slide model information to adjust the x-axis position of the shuttle 128 or 428 such that a concave region leading edge 608 of the slide 130 is within the objective FOV. Operation 804 also uses the slide model information to adjust the z-axis position of the shuttle 128 or 428 such that a focal point of the objective lens 122 is at prescribed height, e.g., at point at one-half the depth of the slide's concave region 606. In an alternative embodiment, markings 616 formed within the channel can be used with an autofocus device to determine the z-axis position of the shuttle to position the objective lens 122 at the prescribed height.

Operation 908 determines a sequence of incremental shuttle moves to sequentially move the objective FOV 144 to a sequence of laterally spaced apart x-dimension shuttle positions at which a sequence of FLIM image scanning sequences can be triggered to incrementally image the entire concave region and the tissue portions therein with a minimal number of FLIM image scanning sequences.

Figure 10:
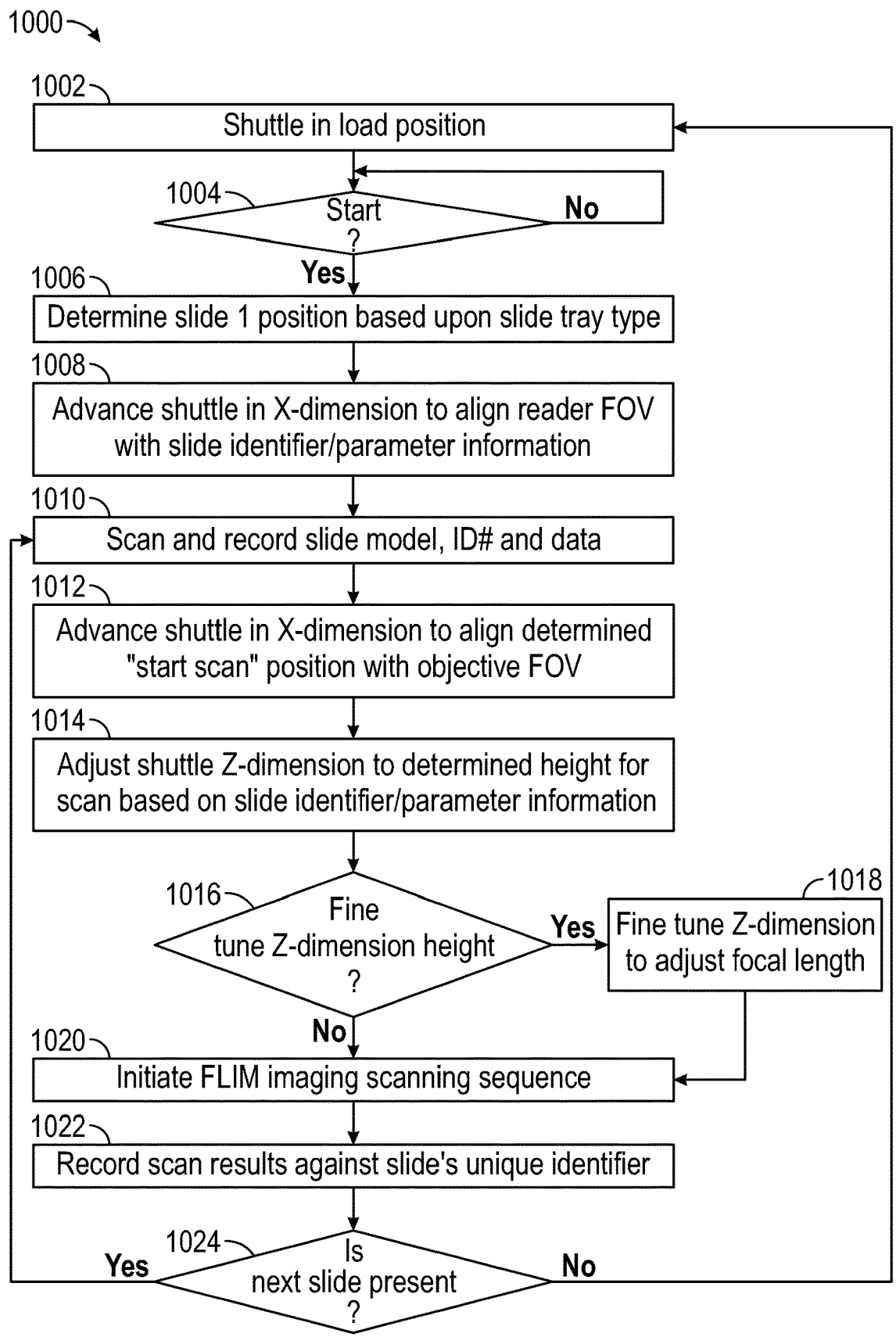
FIG. 10 is an illustrative flow diagram representing an example process 1000 to control a FLIM data capture system 102, in accordance with some embodiments.

FIG. 10 is an illustrative flow diagram representing an example process 1000 to control a FLIM data capture system 102, in accordance with some embodiments. The coordination process is implemented using one or more computing machines 134 programmed with executable instructions to perform the following operations. Operation 1002 returns the shuttle to a loading position. Operation 1004 determines whether a user command has been received to start imaging slides in the shuttle. Operation 1006 determines a lead slide position based upon slide tray type. It is contemplated that there will be a variety of different trays with different types, numbers and arrangements of slides. Operation 1006 determines leading edge position of a lead slide based upon tray type. As used herein, the "lead slide" refers to the slide that is the first to reach the FOVs of the reader 145 and the objective 122 due to shuttle x-direction movement. Operation 1008 causes the x-direction motor to move the shuttle in a lateral x- and y-directions by an amount to align the reader FOV with the lead slide's identifying/parameter information 607. Operation 1010 causes the reader 145 to read and record the identifying/parameter information 607 and to perform the adjustment process 900. Operation 1012 causes the x-axis motor Mx and y-axis motor My to move the shuttle 128 or 428 to a start position based upon a slide model determined using the identifying/parameter information 607 received at the reader 145. Operation 1014 causes the z-axis motors Mz1-Mz4 to move the shuttle 128 or 428 to a position such that a focal point of the objective lens 122 is located at a height determined based upon a slide model determined using the identifying/parameter information 607 received at the reader 145. Operation 1016 determines whether fine adjustment of the z-axis position of the shuttle is required. An adjustment of z-axis position may be required if a tissue sample has a thickness (height) that falls outside a prescribed threshold. Autofocus and markings 608 can be used to make a fine adjustment determination. If fine tuning z-axis adjustment is required, then operation 1018 causes the z-motors Mz1-Mz4 to adjust z-position of the shuttle.

Operation 1020 initiates a FLIM image scanning sequence. As explained above, a FLIM image scanning sequence can include separately scanning each one of multiple positions of a specimen 132 depending upon determined $I_{image}$ value. Operation 1022 records the FLIM image scan results as data 710 in the memory device 708 association with the slide's unique identifier. Operation 1024 determines whether there is a next slide to be scanned by the presence/absence of data (e.g. barcode, QR code, RFID) within the reader. If yes, then the control flows back to operation 1010.

Frequency Domain Wide-Field FLIM Imaging

Figure 11A:
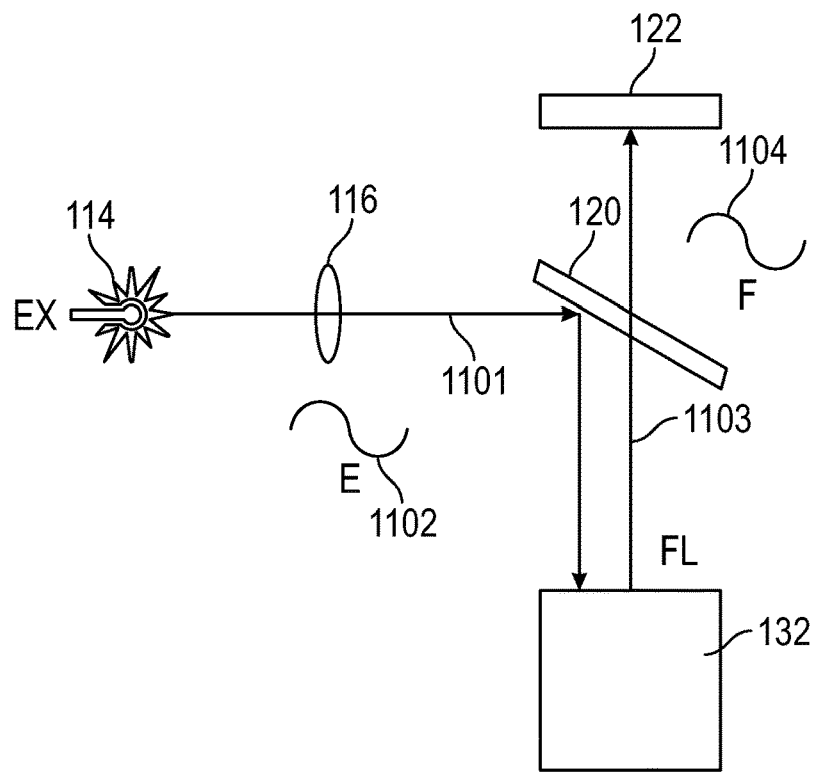
FIG. 11A is a functional schematic diagram showing excitation light and fluorescent emission light during frequency domain wide-field FLIM imaging.
Figure 11B:
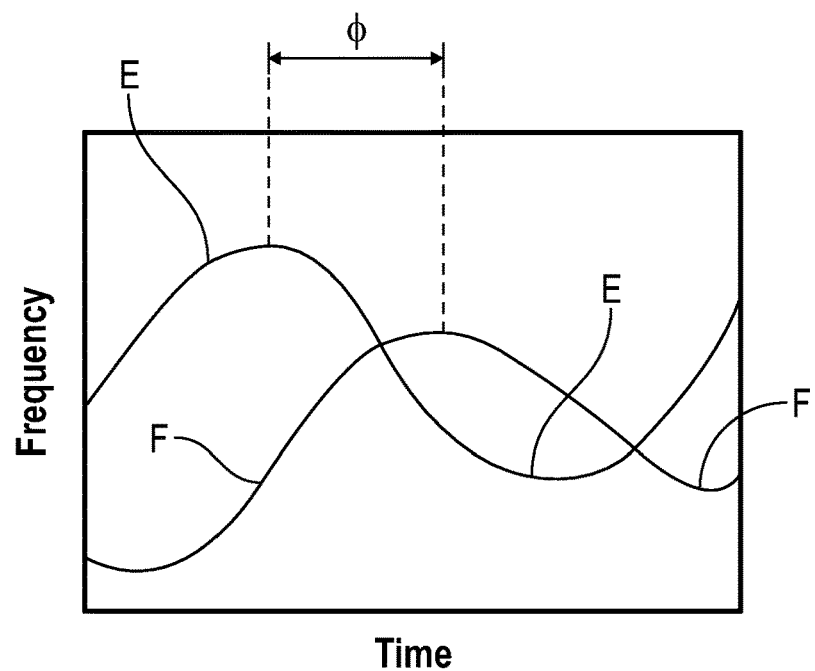
FIG. 11B is an illustrative timing diagram that illustrates a stimulated fluorescent light waveform is shifted in phase and amplitude relative to an excitation light waveform during frequency domain wide-field FLIM imaging.
Figure 11C:
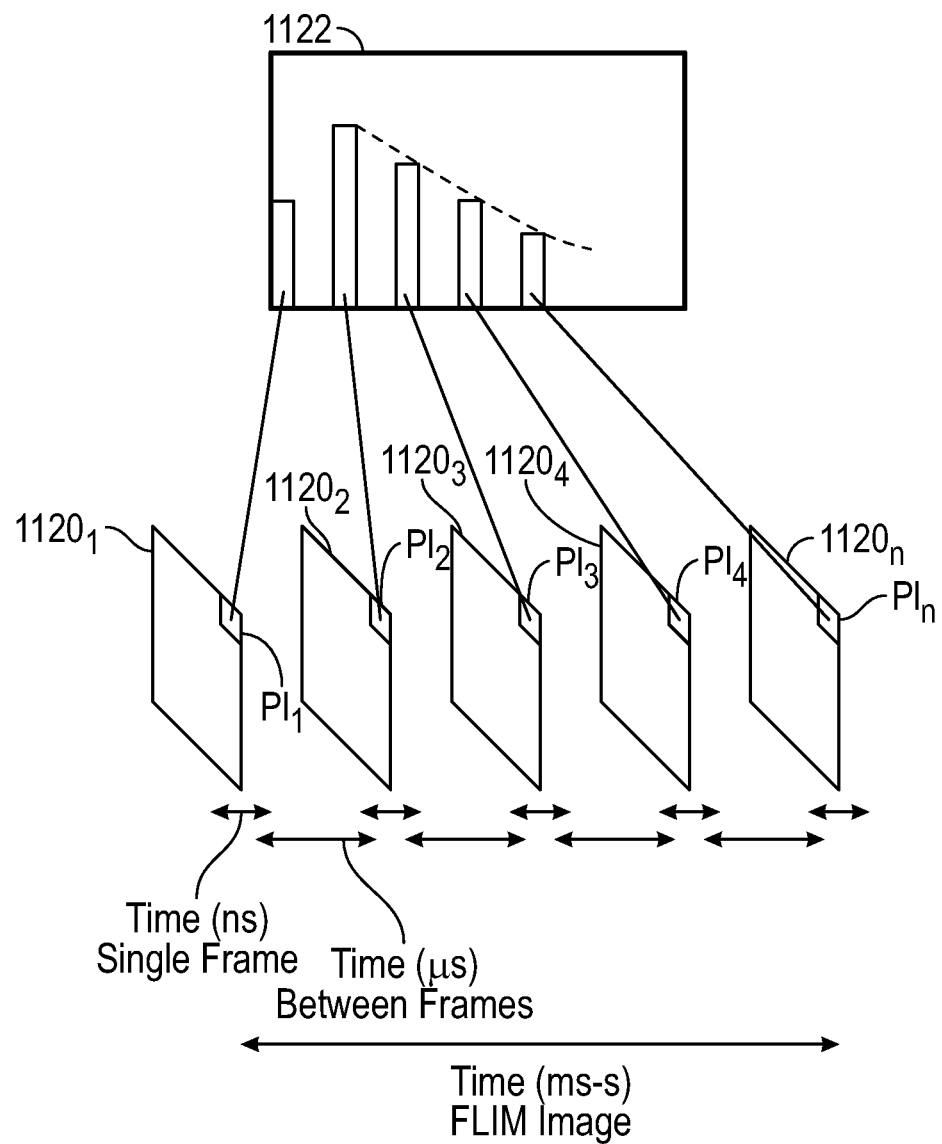
FIG. 11C is an illustrative drawing representing a time-domain wide-field FLIM image using capture using repeated frame acquisitions to produce a histogram of fluorescence decay.

FIGS. 11A-11C are illustrative drawings representing an example frequency and time domain wide-field FLIM imaging event. FIG. 11A is a functional schematic diagram showing excitation light 1101 having a continuous waveform 1102 and fluorescent emission light 1103 having a continuous waveform 1104, during a frequency domain wide-field FLIM imaging. A continuous excitation light source 114 directs excitation light 1101 toward the dichroic beam splitter 120, which reflects the excitation light 1101 toward a tissue specimen 132. The continuous excitation light waveform 1102 can be sinusoidal. A focusing lens 116 collimates the excitation light 1101 so as to encompass a wide-field, having a diameter $I_{image}$, which can be determined based upon a slide model for a slide (not shown) that holds tissue 132 being imaged. The continuous excitation light 1101 having waveform 1102 stimulates the specimen 132 to emit fluorescent emission light 1103 having a corresponding waveform 1104, which passes through the dichroic beam splitter 120 and is incident upon the detector 122. The fluorescent emission light 1103 includes emission from an entire tissue portion within a wide-field having a diameter $I_{image}$ that is illuminated by the excitation light 1101.

FIG. 11B is an illustrative timing diagram that illustrates that the stimulated fluorescent light waveform 1104 is shifted in phase by an amount φ and amplitude relative to the excitation light waveform 1102. The amount of phase shift detected in the emitted fluorescent light is indicative of whether or not cancer cells are present in that region of the field of view.

FIG. 11C is an illustrative drawing representing a time-domain wide-field FLIM method that uses repeated frame acquisitions over a total time of milliseconds to seconds to collect sufficient photons for a complete histogram of fluorescence decay. All of the pixel data for each frame $1120_1$ to $1120_n$ of fluorescence emission data are captured simultaneously from within a wide field of illumination having a diameter determined by the focusing lens 116. A histogram of fluorescence decay 1122 is produced using the multiple frames $1120_1$ to $1120_n$. Each frame is a time-shifted image of a stationary wide-field view. Corresponding information from each frame, e.g., emission intensity values at corresponding pixel locations are superimposed to generate a wide-field image indicating emission intensity decay throughout a spatial region represented by the image.

The frames produce a spatial representation of fluorescence decay, which can provide a corresponding spatial representation of locations of cancerous tissue within a tissue specimen. The example histogram 1122 represents decay time corresponding to a single example pixel location P1 within each of the multiple different frames $1120_1$ to $1120_n$. The emission intensities $P1_1$ to $P1_n$ at that pixel location P1 at the times of occurrence of the corresponding frames $1120_1$ to $1120_{11}$ are used to build up the histogram 1122 that represents decay time at pixel location P1. Thus, the decay time at pixel location P1, in turn, can be indicative of whether tissue at a tissue location corresponding to pixel location P1 is cancerous.

Example—Needle Biopsy

Figure 12A:
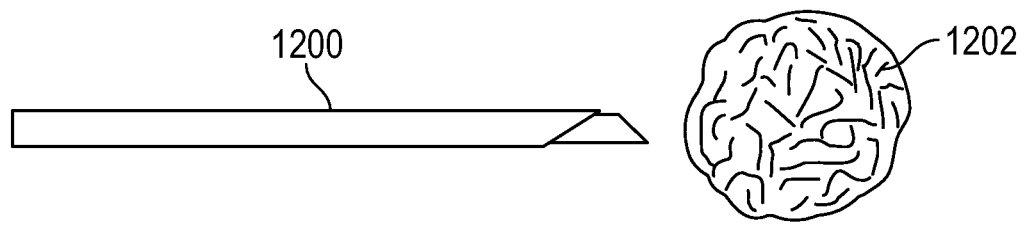
FIGS. 12A-12E are illustrative drawings representing example steps for using a needle biopsy to obtain a tissue specimen and place the specimen into a concave region of a slide.
Figure 12B:
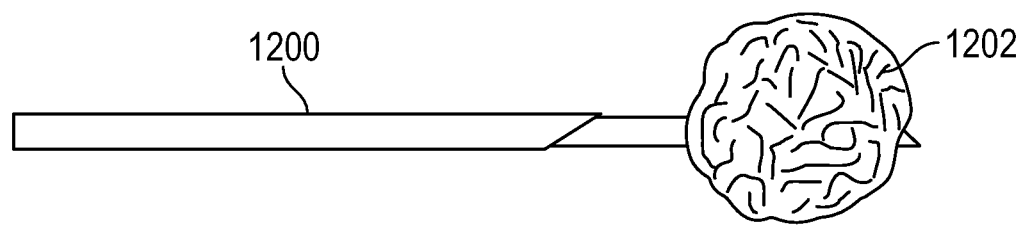
Figure 12C:
Figure 12D:
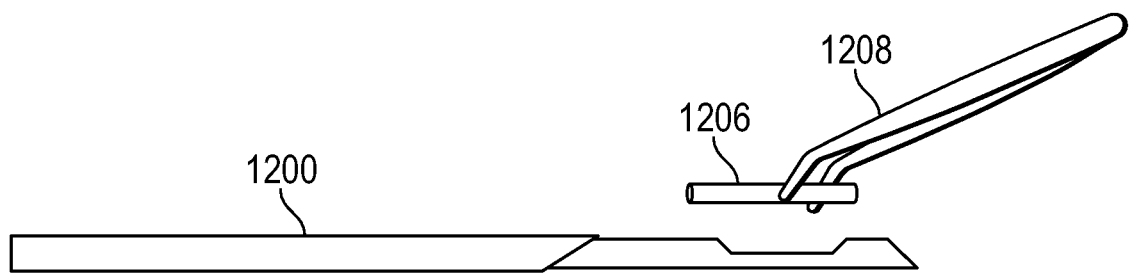
Figure 12E:
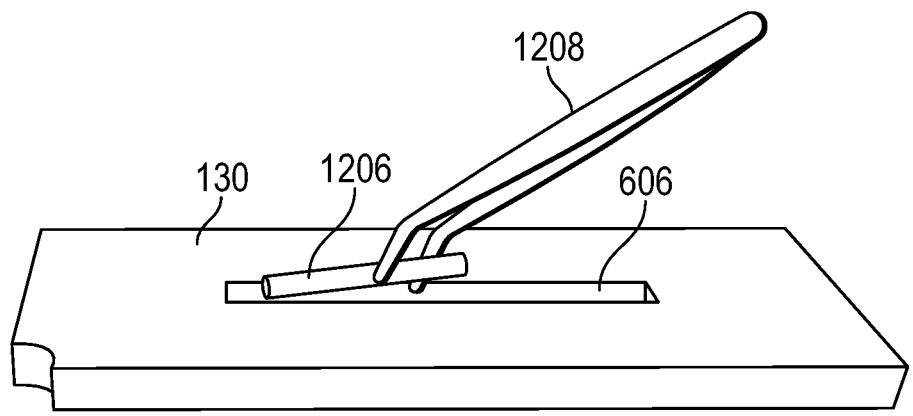

FIGS. 12A-12E are illustrative drawings representing example steps for using a needle biopsy to obtain a tissue specimen and place the specimen into a concave region of a slide. FIG. 12A shows an open-tip biopsy needle 1200 that is about to be passed into anatomical tissue 1202. Specimen collection can be performed using a standard needle/syringe technique or using a vacuum assisted biopsy device employing an open-tip needle 1200. FIG. 12B shows the needle 1200 inserted into the tissue 1202 so that a vacuum can be applied and a core sample from the tissue 1204 can be drawn into the needle 1202 with suction. The needle 1202 may be rotated to facilitate separation of the core from the tissue 1204. FIG. 12C shows the needle 1200 containing the core biopsy specimen 1206 withdrawn from the tumor and the patient. FIG. 12D shows the specimen 1206 ejected or extracted from the needle 1200 and grasped by a tweezer gripper 1208. FIG. 12E shows use of the tweezer gripper 1208 used to place the specimen 1206 within a concave region 606 of a slide 130.

Figure 13A:
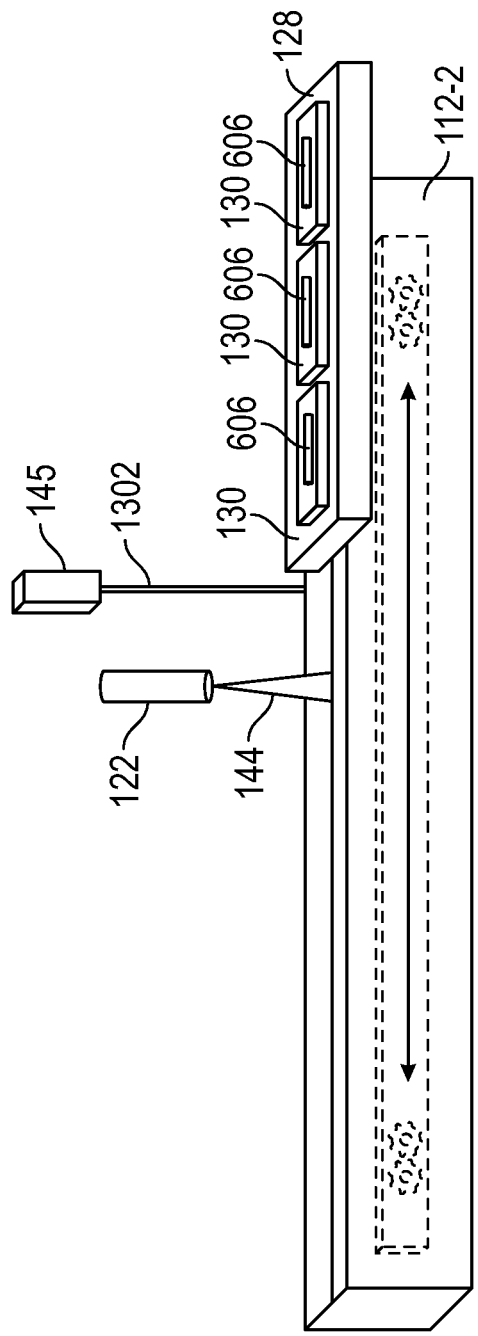
FIG. 13A is an illustrative drawing showing a shuttle in a slide loading position.
Figure 13B:
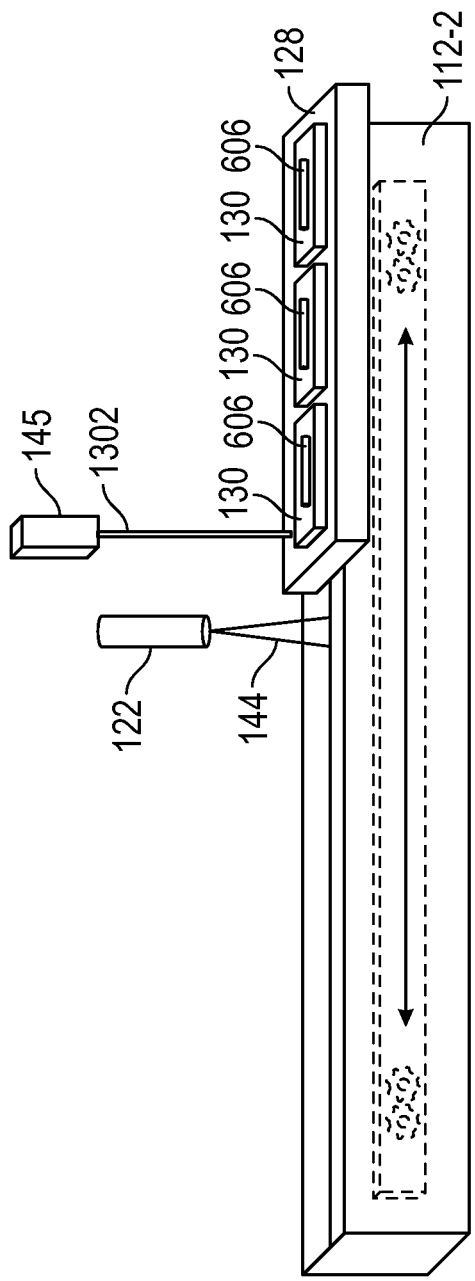
FIG. 13B is an illustrative drawing showing identifying information of a leading slide in the shuttle within a reader's field of view.

Example—Coordinating Reader Activity, Shuttle Lateral Motion, Shuttle Vertical Motion, and FLIM Image Scan FIGS. 13A-13D are illustrative drawings showing coordinated operation of the reader activity, shuttle lateral motion, shuttle vertical motion, and FLIM image scanning. The FLIM fixture and the excitation light source and other details are omitted to simplify the drawings. The reader 145 and the objective 122 are positioned relative to one another such that each slide reaches a reader FOV 1302 before the slide reaches an objective lens FOV 144 of the objective. In the example implementation from the perspective shown in FIGS. 13A-13D, in which the shuttle moves right to left, the reader 145 is located to the right of the objective lens 122. FIG. 13A is an illustrative drawing showing the shuttle 128 in an example slide loading position, which is a first position outside the reader FOV 1302 and outside objective FOV 144. The shuttle 128 can be loaded with slides 130 containing biopsy tissue specimens when located outside the reader's and objective's fields of view. FIG. 13B is an illustrative drawing showing the shuttle 128 in an example second position in which identifying information (e.g., barcode or QR code) of a lead slide 130 reaches the reader FOV 1302. An x-axis motor Mx causes the shuttle 128 to move the lead slide 130 so that the identifying/parameter information is within the reader FOV 1302. In the example slides 130, the identifying/parameter information is located close enough to the lead edge of the slides 130 (i.e., the slide edges that first reach the FOVs of the reader and the objective) so that the slides' identifying/parameter information reaches the reader FOV 1302 before the concave region 606 of the slide 130 reaches the objective FOV 144.

Still referring to FIG. 13B, the reader 145 reads the identifying information, and based upon the identifying information, z-direction second motors Mz1-Mz4 can adjust the vertical z-axis position of the shuttle 128 and the slides 130 mounted thereon such that the focal point of the objective lens 122 is located at a prescribed depth which can be at about 50 percent of the height of the slide's concave region 606. In an example FLIM-based biopsy system, the objective lens 122 remains in a fixed position relative to the fixture 112-1, and the shuttle's vertical z-axis position is adjusted in order to change the focal point of the objective lens 122 relative to a slide's concave region 606 and tissue contained therein. Also referring to 13B, the reader reads the identifying information to reference the Dload data necessary to move the slide into the start scan position for 13C

Figure 13C:
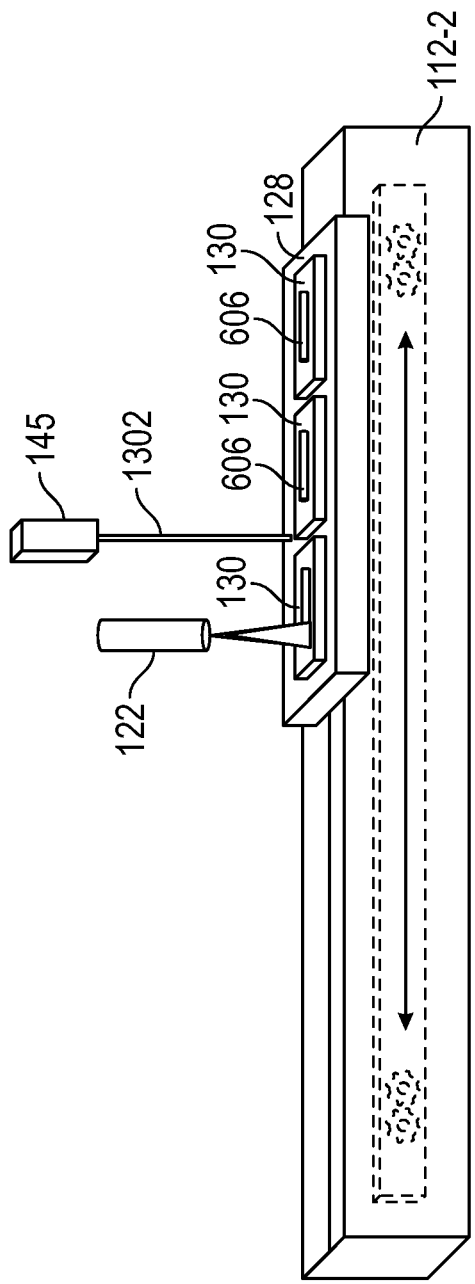
FIG. 13C is an illustrative drawing showing a leading portion of a concave region and a biopsy specimen therein within an objective's field of view.

FIG. 13C is an illustrative drawing showing the shuttle 128 in an example third position in which a portion of the concave region 606 of the lead slide 130 is within the objective's FOV 144. While in this third position the x-axis motor Mx temporarily halts lateral x-axis movement of the shuttle 128, and the wide field fluorescence microscope 110 images a portion of a tissue specimen located within the objective's FOV 144. Excitation light from the excitation light source 114 shines through the objective 122 and onto that portion of a specimen within the slide's concave region 606 that is within the objective lens's FOV 144, and fluorescence light emission stimulated by the excitation light shines from the tissue portion through the objective lens 122 to the light detector 126. While in the example position shown in FIG. 13C, identifying information applied to a next slide in the sequence is positioned within the reader's FOV 1302. The reader 145 reads the identifying information for the next slide 130 to determine whether to cause the z-axis motors Mz1-Mz4 to adjust the vertical z-position of the shuttle 128 for imaging of the next slide.

Figure 13D:
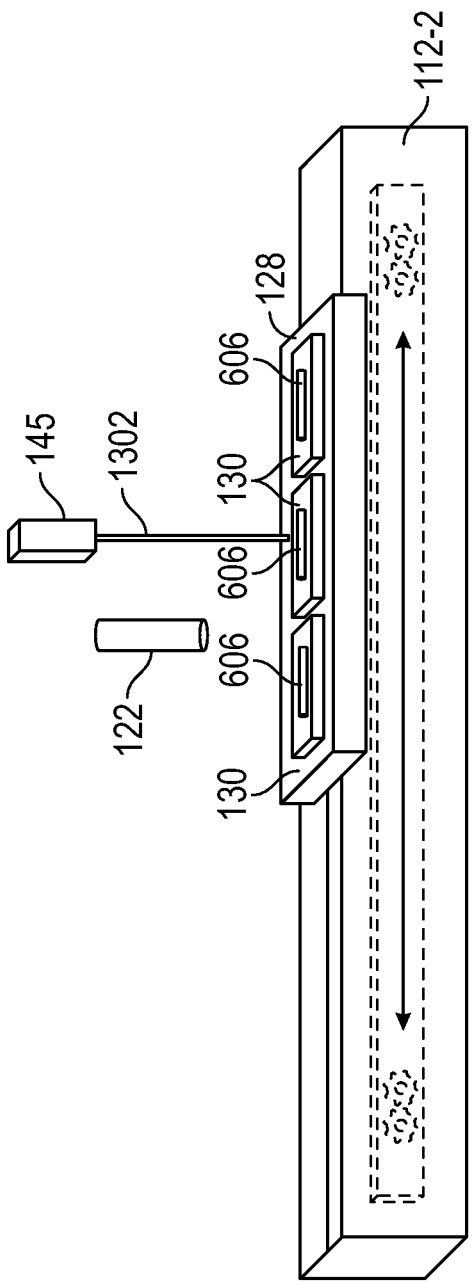
FIG. 13D is an illustrative drawing showing a next portion of a concave region and a biopsy specimen therein within the objective's field of view.

Still referring to FIG. 13C, the objective's FOV 144 may not be large enough to capture an entire tissue specimen within the objective's FOV 144, and the tissue specimen may have to be imaged in increments. Referring now to FIG. 13D, once FLIM imaging of a leading portion of a specimen in the lead slide is complete, the shuttle 128 advances incrementally to bring a next portion of the specimen into the objective's FOV 144. Whereupon the wide field fluorescence microscope 110 images that next portion of the current specimen. This incremental shuttle movement and FLIM imaging continues until the entire specimen has been scanned. The z-direction motor may adjust the vertical, z-axis, position of the shuttle to adjust the focal point of the objective lens for the next slide, and the FLIM imaging and reader reading continues until all slides 130 in the shuttle 128 have been imaged.

EXPERIMENTAL RESULTS

General Background

Six subject mice injected with cell lines for human breast cancer and healthy human breast tissue acquired from ATCC.

| Cancer cell line | BT474 |
| Normal breast cell line | 184A1 (control) |

The mouse models acquired from Certis Oncology, Inc. CA cell line injected into the left 5th mammary fat pad of each subject and allowed to grow for forty-five days. The mice were monitored daily by Certis, which reported no visible tumor growth during the incubation period. Twenty-four hours prior to shipping, a bolus of breast tissue cell line was injected into the right fifth mammary fat pad to serve as a control.

The expectation was that there would be clearly delineated tumor growth with visible mass, asymmetry between CA and benign injection sites, and palpable difference between the injection sites.

However, our subjects had no detectable tumors. Two weeks prior to study, the laboratory reported no tumor growth on our subjects. On receipt of subjects, all six subjects were evaluated for tumor growth. No visible or palpable tumors were located on the mammary fat pads. There was no visible difference between the cancer and benign sites. On dissection, there was no obvious solid growths were found subcutaneously or retroperitoneally. Cancer side was marked with black ink on the right side of each animal and the benign side was marked with red ink on the left side of each animal. Right and left glands were dissected in each animal.

Methodology

Despite negative findings for tumor growth, decision to proceed with POC Believed we would find diffused disease, even if solid tumors were not present.

Mouse 1: used to search for optimal device settings for FLIM imaging. Two sets of samples used to adjust excitation wavelength and window. Excitation wavelength—wavelength used by the laser to stimulate excitation of the sample. Window—search window used to constrain the wavelengths of photons that will be detected.

Mice 2-6: repeated imaging based on parameters of M1 samples 2 & 3. Dissection of bilateral 5th mammary fat pads. Two samples taken; one from tumor injection site, one from control injection site.

Samples were viewed on FLIM using the settings determined in mouse 1. Samples placed in preservative following imaging for histopathology analysis. Fourteen samples were processed by Certis and digitized for examination by pathologist Pathology Analysis Pathology detected cancer in 3 of the 14 samples (all on the black marker/right, cancer side) Mouse 1, sample 4 and Mouse 5, sample 2.

The remaining 11 samples were negative for cancer (all on the red marker/left, benign side).

CONCLUSIONS

Samples containing human cancer looked vastly different from samples containing benign human breast tissue in that on observation, the images of cancer versus benign tissue qualitatively appeared starkly different from one another. Mathematical analysis was not conducted on the images. Hallmarks of carcinoma appeared to include increased cellular density (multitude of crowded cells) and high density of mitoses as well as consistent lifetime values in the range of about 1.7 nanoseconds. Benign cells demonstrated consistently higher lifetime values and lacked the visual properties described above including high cellular density and high density of mitoses. In our study, we designated low lifetimes (e.g. 1.7 nanoseconds) with the color red, whereas higher lifetimes were designated as green and/or blue.

From animal sacrifice to results, t=20 minutes, meaning rapid images were obtainable and would easily fit into clinical flow Limitations There were no gross tumor visible (this was not truly problematic since our pathologist found cancer where the FLIM demonstrated cancer)

FLIM machine used was single photon scanning confocal microscope (unable to visualize entire specimen) This particular FLIM machine showed an extremely high degree of resolution using femtosecond laser (unnecessary for our purposes). In order to achieve that degree of resolution, the FOV is compromised, and only a small portion of tissue can be visualized. While we will be knowingly sacrificing a very small amount of resolution in order to visualize the entire sample and thus the entire tumor, we do not believe this degree of resolution is clinically necessary to make a highly accurate diagnosis. It is far more important to visualize the entire specimen (RW).

The above description is presented to enable any person skilled in the art to create and use wide-field FLIM to rapidly capture fluorescence decay rate-based image data. Various modifications to the embodiments will be readily apparent to those skilled in the art, and the generic principles defined herein may be applied to other embodiments and applications without departing from the spirit and scope of the invention. For example, time domain based scanning can be used as an alternative to frequency domain based scanning. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of examples in accordance with the present invention are merely illustrative of the principles of the invention. Therefore, it will be understood that various modifications can be made to the embodiments by those skilled in the art without departing from the scope of the invention, which is defined in the appended claims.

The invention claimed is:

1. A method comprising:
positioning a slide that includes a concave region that is formed in a top surface of the slide and that can contain an object, such that a focal point of an objective lens of a fluorescence lifetime imaging microscopy (FLIM) device is within an area of the concave region between a bottom surface of the concave region and the top surface of the slide; and
using the FLIM device to capture a sequence of wide field images of a portion of the object within a field of view of the objective lens; and
wherein positioning the slide includes moving the slide laterally relative to the objective lens to a sequence of different slide positions such that a different portion of the concave region is within the field of view of the objective lens at each different slide position; further including:
at each different slide position, using the FLIM device to capture a sequence of wide field images of an entire portion of the object within the field of view of the objective lens at the different slide position.

2. The method of claim 1,
wherein positioning the slide includes positioning the slide such that the focal point of the objective lens is within the object contained within the concave region.

3. The method of claim 1,
wherein using the FLIM device to capture the wide field image of the object within the field of view of the objective lens includes simultaneously capturing the wide field image of the entire portion of the object within the field of view of the objective lens.

4. The method of claim 1,
wherein using the FLIM device to capture the sequence of wide field images of the object within the field of view of the objective lens includes capturing a frequency domain wide field image.

5. A system comprising:
one or more slides each including a concave region suitable to contain an object and each including identifying information thereon;
a fluorescence lifetime imaging microscopy (FLIM) device that includes an objective lens;
a reader configured to read the identifying information included on the one or more slides;
a stage positioned opposite the objective lens of the FLIM device and positioned opposite the reader;
a shuttle moveably mounted to the stage and holding the one or more slides;
one or more motors configured to impart motion to the shuttle;
a computing machine configured with instructions to perform operations including:
causing the one or more motors to impart motion to the shuttle to position at least one of the slides held by the shuttle such that the reader can read the identifying information on the at least one slide;
causing the reader to read the identifying information on the at least one slide;
causing the one or more motors to impart motion to the shuttle, based upon the identifying information read by the reader, to vertically position the at least one slide relative to the objective lens such that a focal point of the objective lens is within an area of the concave region of the at least one slide between a bottom surface of the concave region and a top surface of the at least one slide; and
causing the FLIM device to capture a sequence of wide field images of a portion of an object within the concave region of the at least one slide that is within a field of view of the objective lens.

6. The system of claim 5,
wherein causing the one or more motors to impart motion to the shuttle, based upon the identifying information read by the reader, to vertically position the at least one slide relative to the objective lens, includes imparting motion to position the at least one slide such that the focal point of the objective lens is within the object contained within the concave region of the at least one slide.

7. The system of claim 5 further including:
causing the one or more motors to impart motion to the shuttle, based upon the identifying information read by the reader, to move the at least one slide laterally relative to the objective lens to a sequence of different positions such that a different portion of the concave region of the at least one slide is within the field of view of the objective lens at each different slide position; further including:
at each different slide position, causing the FLIM device to capture a wide field image of a portion of the object within the concave region of the at least one slide that is within the field of view of the objective lens at the different slide position.

8. The system of claim 5,
wherein causing the FLIM device to capture the wide field image of the object within the field of view of the objective lens includes causing the FLIM device to simultaneously capture the wide field image of an entire portion of the object within the field of view of the objective lens.

9. The system of claim 5,
wherein causing the FLIM device to capture the sequence of wide field images of the object within the field of view of the objective lens includes causing the FLIM device to capture a sequence of frequency domain wide field images.

* * * * *